(12) United States Patent
Rowe

(10) Patent No.: US 11,351,825 B2
(45) Date of Patent: Jun. 7, 2022

(54) STABILIZATION SYSTEM FOR A VEHICLE

(71) Applicant: Oshkosh Corporation, Oshkosh, WI (US)

(72) Inventor: Ryan F. Rowe, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 34 days.

(21) Appl. No.: 16/896,828

(22) Filed: Jun. 9, 2020

(65) Prior Publication Data

US 2021/0221190 A1 Jul. 22, 2021

Related U.S. Application Data

(60) Provisional application No. 62/859,282, filed on Jun. 10, 2019.

(51) Int. Cl.
*B60G 1/00* (2006.01)
*B60G 17/015* (2006.01)

(52) U.S. Cl.
CPC ........... *B60G 1/00* (2013.01); *B60G 17/0157* (2013.01); *B60G 2200/345* (2013.01); *B60G 2200/347* (2013.01); *B60G 2202/442* (2013.01); *B60G 2500/30* (2013.01)

(58) Field of Classification Search
CPC ...... B60G 1/00; B60G 17/00; B60G 17/0157; B60G 2200/345; B60G 2200/347; B60G 2202/442; B60G 2500/30; B60S 9/00
USPC ..................... 280/6.151–153; 296/7
See application file for complete search history.

(56) References Cited

U.S. PATENT DOCUMENTS

| | | | |
|---|---|---|---|
| 3,856,344 A * | 12/1974 | Loeber | B62D 53/0842 296/204 |
| 6,349,952 B1 * | 2/2002 | Kallstrom | B60G 11/27 280/124.157 |
| 6,516,914 B1 | 2/2003 | Andersen et al. | |
| 6,561,718 B1 | 5/2003 | Archer et al. | |
| 6,764,085 B1 | 7/2004 | Anderson | |
| 6,779,806 B1 | 8/2004 | Breitbach et al. | |
| 6,860,332 B1 | 3/2005 | Archer et al. | |
| 6,883,815 B2 | 4/2005 | Archer | |
| 6,976,688 B2 | 12/2005 | Archer et al. | |
| 7,107,129 B2 | 9/2006 | Rowe et al. | |
| 7,207,582 B2 | 4/2007 | Siebers et al. | |
| 7,270,346 B2 | 9/2007 | Rowe et al. | |
| 7,274,976 B2 | 9/2007 | Rowe et al. | |
| 7,322,627 B1 * | 1/2008 | Nicholson | B60G 11/04 280/6.151 |
| 7,472,914 B2 | 1/2009 | Anderson et al. | |

(Continued)

*Primary Examiner* — Paul N Dickson
*Assistant Examiner* — Caitlin Anne Miller
(74) *Attorney, Agent, or Firm* — Foley & Lardner LLP

(57) ABSTRACT

A stabilization system for an adjustable ride height military vehicle includes a support member fixedly coupled with an underside of the military vehicle and extending in a downwards direction from the underside of the military vehicle. The support member is configured to engage a ground surface directly below the military vehicle when the military vehicle lowers from a first position to a second position. The support member is configured to provide additional stability for the military vehicle during a ballistics operation through the engagement between the support member and the ground surface when the military vehicle is lowered to the second position.

15 Claims, 13 Drawing Sheets

(56) References Cited

U.S. PATENT DOCUMENTS

| | | | |
|---|---|---|---|
| 7,683,564 | B2 * | 3/2010 | Harris ............... B66C 23/80 318/565 |
| 7,715,962 | B2 | 5/2010 | Rowe et al. |
| 8,333,390 | B2 * | 12/2012 | Linsmeier ........... B60G 17/018 280/5.514 |
| 8,375,077 | B2 | 2/2013 | Venton-Walters |
| 8,439,373 | B2 * | 5/2013 | Deegan ............... B60S 9/12 280/6.15 |
| 8,465,025 | B2 | 6/2013 | Venton-Walters et al. |
| 8,595,648 | B1 | 12/2013 | Venton-Walters et al. |
| 8,764,029 | B2 | 7/2014 | Venton-Walters et al. |
| 8,801,017 | B2 | 8/2014 | Ellifson et al. |
| 8,876,133 | B2 | 11/2014 | Ellifson |
| 8,955,859 | B1 | 2/2015 | Richmond et al. |
| 8,955,880 | B2 | 2/2015 | Malcolm et al. |
| 8,991,834 | B2 | 3/2015 | Venton-Walters et al. |
| 8,991,840 | B2 | 3/2015 | Zuleger et al. |
| 9,016,703 | B2 | 4/2015 | Rowe et al. |
| 9,045,014 | B1 * | 6/2015 | Verhoff ............... B62D 21/18 |
| 9,291,230 | B2 | 3/2016 | Ellifson et al. |
| 9,327,576 | B2 | 5/2016 | Ellifson |
| 9,329,000 | B1 | 5/2016 | Richmond et al. |
| 9,434,321 | B2 | 9/2016 | Perron et al. |
| 9,656,640 | B1 | 5/2017 | Verhoff et al. |
| 9,669,679 | B2 | 6/2017 | Zuleger et al. |
| 9,688,112 | B2 | 6/2017 | Venton-Walters et al. |
| 9,764,613 | B2 | 9/2017 | Rowe et al. |
| 9,809,080 | B2 | 11/2017 | Ellifson et al. |
| 9,890,024 | B2 | 2/2018 | Hao et al. |
| 10,144,389 | B2 | 12/2018 | Archer et al. |
| 10,167,027 | B2 | 1/2019 | Perron et al. |
| 10,221,055 | B2 | 3/2019 | Hao et al. |
| 10,359,860 | B2 | 8/2019 | Ellifson et al. |
| 10,392,056 | B2 | 8/2019 | Perron et al. |
| 10,407,288 | B2 | 9/2019 | Hao et al. |
| 10,421,332 | B2 | 9/2019 | Venton-Walters et al. |
| 10,434,995 | B2 | 10/2019 | Verhoff et al. |
| 10,464,389 | B2 | 11/2019 | Zuleger et al. |
| 10,611,204 | B1 | 4/2020 | Zhang et al. |
| 10,632,805 | B1 | 4/2020 | Rositch et al. |
| 10,723,282 | B2 | 7/2020 | Perron et al. |
| 10,752,075 | B1 | 8/2020 | Shukla et al. |
| 10,759,251 | B1 | 9/2020 | Zuleger |
| 10,934,145 | B2 | 3/2021 | Hao et al. |
| 10,940,728 | B2 | 3/2021 | Rositch et al. |
| 10,953,939 | B2 | 3/2021 | Zuleger et al. |
| 10,981,538 | B2 | 4/2021 | Archer et al. |
| 2002/0129696 | A1 * | 9/2002 | Pek ............... F41A 23/34 89/40.01 |
| 2007/0284866 | A1 * | 12/2007 | Hanson ............ E02F 9/085 280/763.1 |
| 2012/0261213 | A1 * | 10/2012 | St-Yves ............ B60S 9/12 182/64.1 |
| 2016/0145941 | A1 * | 5/2016 | Betz ............... A62C 27/00 182/66.1 |
| 2016/0176331 | A1 * | 6/2016 | Weldy ............. B60G 17/017 280/6.151 |
| 2019/0337348 | A1 | 11/2019 | Venton-Walters et al. |
| 2019/0337350 | A1 | 11/2019 | Ellifson et al. |
| 2019/6352157 | | 11/2019 | Hao et al. |
| 2020/0082071 | A1 | 2/2020 | Zuleger et al. |
| 2020/0094671 | A1 | 3/2020 | Wildgrube et al. |
| 2020/0223277 | A1 | 7/2020 | Zhang et al. |
| 2020/0384823 | A1 | 12/2020 | Shukla et al. |
| 2020/0391569 | A1 | 12/2020 | Zuleger |
| 2021/0107361 | A1 | 4/2021 | Linsmeier et al. |

* cited by examiner

STABILIZATION SYSTEM FOR A VEHICLE

CROSS-REFERENCE TO RELATED APPLICATION

This application claims priority to U.S. Provisional Patent Application No. 62/859,282, filed Jun. 10, 2019, the content of which is hereby incorporated by reference in its entirety.

BACKGROUND

The present disclosure relates generally to vehicles. More particularly, the present disclosure relates to stabilization systems for vehicles (e.g., ballistic vehicles, missile launching vehicles, construction vehicles, etc.).

SUMMARY

One implementation of the present disclosure is a stabilization system for a military vehicle, according to an exemplary embodiment. The stabilization system includes a support member and a primary mover. The support member is configured to selectively transition between a first position and a second position. The support member is tucked beneath a body of the military vehicle when in the first position and engages a ground surface below the body of the military vehicle when in the second position. The primary mover is configured to selectively and adjustably drive the support member to transition between the first position and the second position. The support member is configured to provide additional stability for the military vehicle during a ballistics operation through the engagement between the support member and the ground surface.

Another implementation of the present disclosure is a stabilization system for an adjustable ride height military vehicle, according to an exemplary embodiment. The stabilization system includes a support member fixedly coupled with an underside of the military vehicle and extending in a downwards direction from the underside of the military vehicle. The support member is configured to engage a ground surface directly below the military vehicle when the military vehicle lowers from a first position to a second position. The support member is configured to provide additional stability for the military vehicle during a ballistics operation through the engagement between the support member and the ground surface when the military vehicle is lowered to the second position.

Another implementation of the present disclosure is a stabilization system for a vehicle, according to an exemplary embodiment. The stabilization system includes a first set of multiple support members, and a second set of multiple support members. The first set of multiple support members are pivotally coupled with an underside of the military vehicle. The multiple support members of the first set are configured to rotate in unison to transition the stabilization system between a tucked configuration and a deployed configuration. The second set of multiple support members are pivotally coupled with the underside of the military vehicle. The multiple support members of the second set are configured to rotate in unison to transition the stabilization system between the tucked configuration and the deployed configuration. The multiple support members of the first set are rotated in a first direction to transition the stabilization system from the tucked configuration to the deployed configuration and the multiple support members of the second set are rotated in a second direction, opposite the first direction, to transition the stabilization system from the tucked configuration to the deployed configuration.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1A:
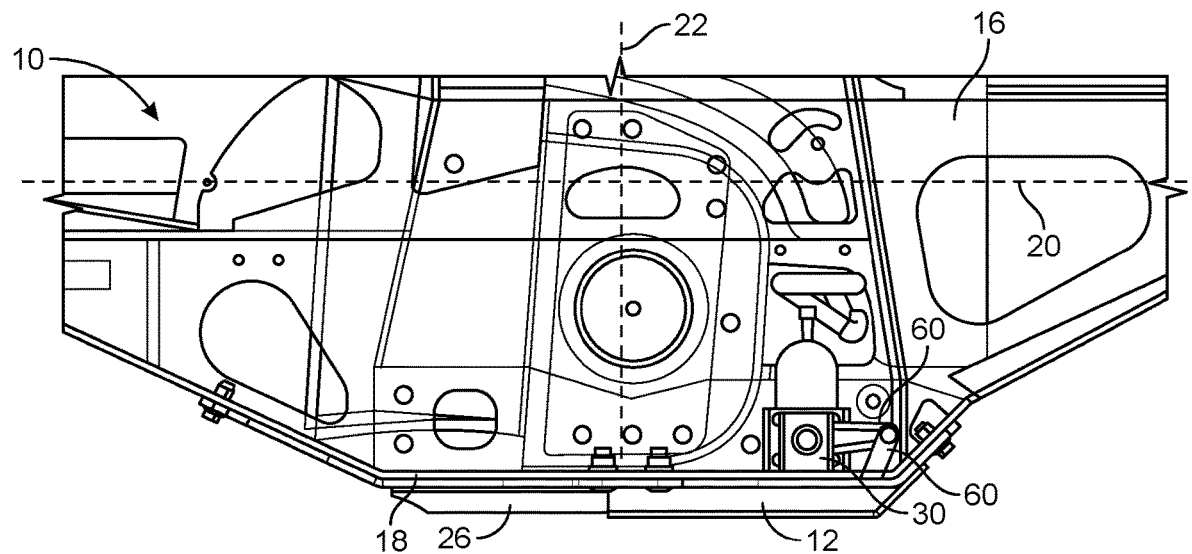
FIG. 1A is a side view of a stabilization system for a military vehicle in a disengaged or "first" configuration or position, according to an exemplary embodiment.

Referring generally to the FIGURES, a stabilization system for a vehicle includes a stabilizing member coupled (e.g., fixedly coupled with the vehicle, movably coupled to the vehicle) at an underside of the vehicle that selectively engages a corresponding ground surface below the vehicle. The stabilizing member can be a deployable member that pivots, extends, translates, or otherwise moves relative to the vehicle to transition into engagement with the ground. In other applications, the stabilizing member can be fixedly coupled to the vehicle so that the stabilizing member selectively engages the ground by adjusting the suspension of the vehicle. For example, a body of the vehicle may be lowered by evacuating air or fluid from a chamber of a damper that controls a ride height of the vehicle. The ride height of the vehicle or the degree of deployment of the stabilizing member can be controlled by a user or operator of the vehicle.

Vehicles including ballistic weaponry (e.g., missile launchers) may experience recoil when operating the ballistic weaponry. As projectiles are launched from the ballistic weaponry toward a target, reactionary forces from the projectiles may be transferred through the ballistic weaponry to the vehicle. If the reactionary forces are not aligned through the vehicle's center of gravity, the reactionary forces may cause the vehicle to pitch, roll, lean, etc. Accordingly, these reactionary forces can compromise the accuracy of ammunition (e.g., missiles, bullets, mortars, etc.) that are launched from the vehicle. The stabilization system described herein can selectively engage the ground (e.g., by deploying one or more stabilizing members or by adjusting the ride height of the vehicle) to provide additional stability and force/impact absorbing contact between the vehicle and the ground. This enables smaller framed or lighter duty vehicles to selectively transition into a stabilized configuration (e.g., to selectively transition the stabilizing member into engagement with the ground surface) so that ballistic weaponry can be used on the smaller framed or lighter vehicle without damaging the vehicle or compromising the accuracy of the fired ammunition.

The stabilizing member can function as an extendable or deployable "foot" or landing gear so that a reducible height suspension can lower the vehicle until the stabilizing member rests upon the ground surface. The additional stability facilitates providing the loading capacity needed to launch larger recoil weapons than the suspension can handle. The stabilizing member can also function as both a skid plate to protect an undercarriage of the vehicle. When the stabilizing member is not in the deployed position/configuration (i.e., the second position), it can be retracted into an axle assembly of the vehicle to retain maximum axle ground clearance.

The stabilization system can be controlled or transitioned between the deployed/engaged configuration and the tucked/stowed configuration through operation of a motor, an engine, a hydraulic cylinder, an actuator, a rotary actuator, a linear actuator, a piston, etc., generally referred to as a primary or prime mover. The prime mover can be selectively operated by a user. A controller having a processor, processing circuit, and/or memory can receive a user input to transition the stabilization system through a user interface or a human machine interface. For example, any number of buttons, screens, levers, knobs, dials, switches, etc., can be positioned on the vehicle (e.g., within a cab of the vehicle) that the operator/driver of the vehicle can use to selectively transition the stabilization system between the engaged configuration and the disengaged configuration. In other embodiments, stabilization system can be controlled remotely. For example, the controller can communicate with a remote or distant device to receive commands to transition the stabilization system between the engaged configuration and the disengaged configuration.

Stabilization System with Linkages

Figure 1B:
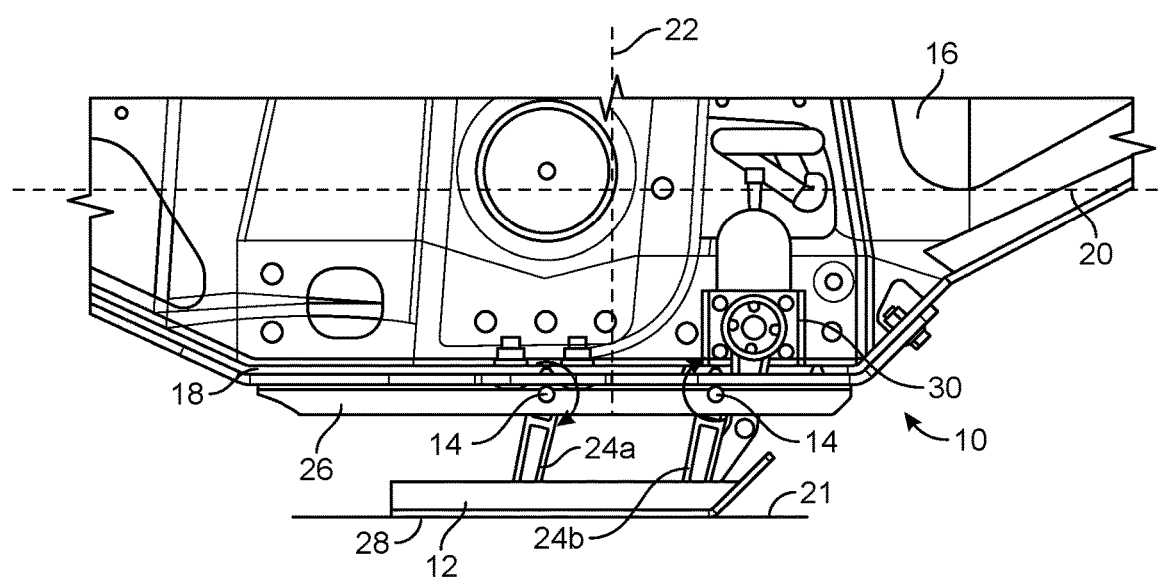
FIG. 1B is a side view of the stabilization system of FIG. 1A in an engaged or "second" configuration or position, according to an exemplary embodiment.

Referring particularly to FIGS. 1A-1B, a stabilization system 10 (e.g., a stabilizer, a stabilization apparatus, a stabilization mechanism, etc.) for a military vehicle 16 (e.g., a missile launching vehicle, an armored vehicle, a military vehicle, a weapon mounted vehicle, a tank, a wheeled military vehicle, etc.) includes a stabilization pad, a stabilization member, a selectably repositionable member, an extendable member, a pad, a planar member, a foot, a stabilizing bar, a plate, a support member, an engagement member, a ground engagement member, a ground pad, etc., shown as stabilizing member 12. Stabilization system 10 is selectively and/or adjustably transitionable between the configuration shown in FIG. 1A (e.g., a first configuration/position, a stowed configuration/position, a tucked configuration/position, a disengaged configuration/position, etc.) and the configuration shown in FIG. 1B (e.g., an extended configuration/position, a deployed configuration/position, a second configuration/position, an engaged configuration/position, etc.).

When military vehicle 16 launches a missile or is used for ballistic operations (e.g., with weapons, missile launchers, firearms, etc., that are mounted about military vehicle 16 or fixedly coupled with military vehicle 16), military vehicle 16 may experience recoil, a reactionary force, an impulse, etc., from operation of the ballistic operations. This recoil from performing the ballistic operation can cause military vehicle 16 to roll or experience excessive stresses through a suspension system of military vehicle 16. Certain military vehicles 16 are equipped with sufficiently strong suspension systems to perform the ballistic operations. However, smaller military vehicles 16 may be prevented from performing the ballistic operations due to limitations of the suspension system, the frame, etc. It would be advantageous to allow military vehicles 16 with smaller or limited suspension systems to perform ballistic operations, thereby facilitating smaller military vehicles 16 with improved stability for ballistic operations and facilitating using larger ballistic weaponry on smaller military vehicles 16. It should be understood that while the systems and methods described herein are described with reference to a military vehicle, the systems and methods (e.g., the stabilization systems) described herein can be used with any vehicle that may experience or undergo shocks, impulses, forces, etc., during operation. For example, stabilization system 10 may be provided as part of an/or configured for use with or usable with another type of vehicle or machine (e.g., commercial equipment, construction equipment, a wrecker vehicle, a wrecker, wrecking ball equipment, demolition equipment, a lift device, etc.).

Stabilization system 10 can be mounted to an underside, a bottom side, a bottom surface, a bottom portion, a lower portion, a surface, a lower frame member, a lower suspension member, a bottom edge, a lower periphery, an undercarriage, etc., of military vehicle 16, shown as underside 18. Stabilization system 10 can fixedly couple with underside 18 to facilitate providing additional stability between military vehicle 16 and a ground surface 21. Stabilizing member 12 can function as both a stabilization member (e.g., when stabilization system 10 is transitioned into the second, engaged configuration shown in FIG. 1B) as well as a skid plate (e.g., when stabilization system 10 is transitioned into the first or disengaged configuration shown in FIG. 1A) to protect underside 18 or undercarriage of military vehicle 16 during driving operations. Stabilizing member 12 can transition between the configuration/position shown in FIG. 1A and the configuration/position shown in FIG. 1B. When stabilizing member 12 is transitioned into the stowed configuration/position shown in FIG. 1A, stabilizing member 12 is retracted into or at least partially into an axle assembly of military vehicle 16. When stabilizing member 12 is transitioned into the deployed configuration/position shown in FIG. 1B, stabilizing member 12 may be moved, translated, etc., to engage, contact, or otherwise removably couple with ground surface 21 to provide additional stability for military vehicle 16.

When stabilization system 10 is transitioned into the configuration shown in FIG. 1B, military vehicle 16 may have an additional point of contact with ground surface 21 between stabilizing member 12 and ground surface 21. For example, if military vehicle 16 has four wheels or tractive elements (see FIGS. 9-10), stabilizing member 12 can provide an additional (e.g., a fifth) point of contact between military vehicle 16 and ground surface 21. Advantageously, this facilitates improved stability for military vehicle 16 and reduces the likelihood that military vehicle 16 will roll if experiencing intermittent or prolonged impulse forces (e.g., due to extreme weather conditions, due to operating ballistic weaponry on military vehicle 16, etc.). Additionally, stabilization system 10 can be selectively and adjustably operated to adjust an amount of the force that is transferred to the suspension system and/or tractive elements of military vehicle 16. For example, stabilization system 10 can be partially deployed, completely deployed, etc., to facilitate reducing an amount of load that the suspension system and/or tractive elements experience.

Stabilizing member 12 can be selectably transitioned (e.g., by an operator, by a driver of military vehicle 16, by a passenger of military vehicle 16, automatically, etc.) between the tucked/stowed configuration shown in FIG. 1A and the deployed/engaged configuration shown in FIG. 1B. In some embodiments, stabilizing member 12 automatically or adjustably transitions into the deployed/engaged configuration as shown in FIG. 1B in response to a user input (e.g., a user request) or in response to an operator initiating ballistic operations. In response to a user request, or in response to completing the ballistic operations, stabilizing member 12 can automatically or adjustably return to the disengaged/stowed/tucked configuration shown in FIG. 1A. In this way, stabilizing member 12 can selectably and/or adjustably transition between the disengaged state/configuration and the engaged state/configuration. In some embodiments, stabilizing member 12 transitions into the engaged state/configuration during driving operations to provide additional protection for underside 18 of military vehicle 16.

Stabilizing member 12 can also include a compliant or sprung suspension system that is stiffer and/or stronger than the suspension system of military vehicle 16 and facilitates absorbing impacts or shocks through stabilizing member 12. For example, stabilizing member 12 may include a rubber pad fixedly coupled at a surface of stabilizing member 12 that engages ground surface 21 such that the rubber pad or compliant member is engaged between stabilizing member 12 and ground surface 21 when stabilizing member 12 is deployed. In some embodiments, stabilization system 10 includes mechanical springs in any linkages, connecting members, bars, beams, elongated members, legs, etc., shown as members 24 that deploy stabilizing member 12 to absorb shocks, forces, impulses, impacts, recoil forces, etc., that military vehicle 16 experiences.

Referring still to FIGS. 1A and 1B, stabilization system 10 includes a launch plate, a body member, a structural member, an engagement member, a frame member, etc., shown as launch plate 26. Launch plate 26 can be underside 18 of military vehicle 16 or can be an additional member (e.g., a component of stabilization system 10 such as a rigid frame members) that is installed, fixedly coupled, attached, fastened, etc., onto underside 18 of military vehicle 16. Stabilizing member 12 is configured to pivotally or rotatably couple with launch plate 26 through members 24 to facilitate deployment (e.g., translation or movement in an arcuate path) and storage of stabilizing member 12. Stabilization system 10 can include a first member 24a and a second member 24b. Members 24 can be any linkage, bar, beam, rigid member, etc., that provides sufficient structural and load bearing capabilities. Launch plate 26 can fixedly couple (e.g., with welds, fasteners, etc.) with underside 18 of military vehicle 16. Launch plate 26 can fixedly couple with one or more frame members at underside 18 of military vehicle 16.

Military vehicle 16 can include or define a longitudinal axis 20 (e.g., a centerline) and a vertical axis 22. Vertical axis 22 can be substantially perpendicular to longitudinal axis 20. In some embodiments, longitudinal axis 20 extends through a center of military vehicle 16 in a front/rearwards direction. Longitudinal axis 20 can also indicate a direction of travel of military vehicle 16 (e.g., a frontwards or rearwards direction). Vertical axis 22 extends in an upwards and downwards direction of military vehicle 16. A lateral axis may extend in a direction perpendicular with both longitudinal axis 20 and vertical axis 22.

First member 24a and second member 24b can be pivotally coupled with launch plate 26 at a first or proximate end of members 24. In some embodiments, members 24 are configured to pivotally or rotatably couple with launch plate 26 through corresponding pins 14 (e.g., cylindrical members, fasteners, bolts, etc.). Pins 14 can be cylindrical members that pivotally couple with launch plate 26 and/or stabilizing member 12. In some embodiments, pins 14 extend through corresponding or co-axial apertures of both stabilizing member 12 and launch plate 26 to facilitate pivotal or rotatable coupling between launch plate 26 and stabilizing member 12.

Members 24 each pivotally couple with stabilizing member 12 at a second or distal end of members 24. In some embodiments, members 24 are substantially parallel to each other and offset a distance along longitudinal axis 20. Members 24 can pivotally couple with stabilizing member 12 at the second or distal end of members 24 using pins and apertures similar to pins 14. In some embodiments, members 24, launch plate 26, and stabilizing member 12 form a four bar linkage. Members 24 can each pivot about their respective first or distal ends in a first direction (e.g., clockwise as shown in FIG. 1B) to deploy stabilizing member 12. In some embodiments, members 24 selectively rotate about their respective first ends in the first direction until a bottom surface of stabilizing member 12 contacts or engages ground surface 21. Likewise, members 24 can pivot about their respective first or distal ends in a second direction that is opposite the first direction (e.g., counter-clockwise) to deploy stabilizing member 12 (e.g., to move the bottom surface of stabilizing member 12 out of engagement or contact with ground surface 21). In some embodiments, an electric motor, a hydraulic pump, a hydraulic motor, an internal combustion engine, etc., shown as prime mover 30 is used to drive members 24 to selectively rotate about their respective first ends in either direction to deploy and/or to disengage stabilizing member 12. Prime mover 30 can be a linear actuator, a rotary actuator, etc., and is configured to selectably and/or adjustably impart mechanical motion/energy to transition stabilization system 10 between the retracted state/configuration and the expanded/engaged state/configuration.

Prime mover 30 can operate members 24 of stabilization system 10 to deploy or disengage stabilizing member 12 (e.g., to transition stabilization system 10 between the first and second configurations/positions) in response to receiving a command from a user (e.g., an operator). In some embodiments, prime mover 30 is configured to adjustably and/or selectively deploy stabilizing member 12 in response to receiving a command from a user. For example, the user can operate prime mover 30 to any configuration between the engaged configuration and the disengaged configuration. Prime mover 30 can be a rotary actuator configured to deploy stabilizing member 12 through linkages 60. A first one of linkages 60 can be fixedly coupled with an output shaft of prime mover 30. A second one of linkages 60 is pivotally coupled with the first one of linkages 60 at a first end, and pivotally coupled with stabilizing member 12 at an opposite or distal end.

Stabilizing member 12 can have a bottom surface 28 (e.g., a bottom portion, a bottom edge, a bottom periphery, etc.) that is driven to engage (e.g., when in the deployed position shown in FIG. 1B) or disengage (e.g., when in the tucked or stowed position as shown in FIG. 1A) ground surface 21. In some embodiments, bottom surface 28 of stabilizing member 12 is a substantially flat surface. In some embodiments, bottom surface 28 of stabilizing member 12 is a contoured or curved surface. Stabilizing member 12 can have a generally planar shape. Stabilizing member 12 can be manufactured from steel, hardened steel, etc., or any other suitable material that provides sufficient structural strength to absorb and withstand recoil originating from a ballistic weapon (or from weather conditions, or any other source). Bottom surface 28 of stabilizing member 12 may be substantially parallel with longitudinal axis 20. In some embodiments, a relative orientation between bottom surface 28 of stabilizing member 12 and longitudinal axis 20 is maintained throughout the transition of stabilization system 10 between the deployed configuration and the tucked/stowed configuration.

Stabilizing member 12 can be a rectangular member, a solid member, a sled-shaped member, etc. In some embodiments, stabilizing member 12 includes axially or laterally extending reinforcement members (not shown) to absorb recoil or shock transferred through military vehicle 16 due to operation of a ballistic device (e.g., a missile launcher).

When stabilizing member 12 is deployed (e.g., transitioned from the configuration shown in FIG. 1A to the configuration shown in FIG. 1B), stabilizing member 12 can move in a longitudinal direction (e.g., along longitudinal axis 20) and a vertical direction (e.g., along vertical axis 22). In some embodiments, stabilizing member 12 moves in a direction that is at least partially downwards along vertical axis 22 (e.g., a direction that increases distance between stabilizing member 12 and underside 18 of military vehicle 16 along vertical axis 22). In some embodiments, stabilizing member 12 moves in a direction that is at least partially along longitudinal axis 20 (e.g., to the left as shown in FIGS. 1A-1B). In some embodiments, stabilizing member 12 moves only in the vertical direction (e.g., stabilizing member 12 moves downwards to engage ground surface 21 but does not move along longitudinal axis 20).

It should be understood that while a four bar linkage defined by linkages/members 24, stabilizing member 12, and launch plate 26 is shown in FIGS. 1A and 1B to transition stabilization system 10 between the tucked/stowed configuration and the deployed configuration, any other apparatus may be used to deploy stabilizing member 12. For example, a vertically oriented scissors mechanism can be used to extend and retract, thereby transitioning stabilizing member 12 into and out of engagement with ground surface 21. In other embodiments, a hydraulic cylinder, a piston, etc., is used to deploy stabilizing member 12 along a substantially vertical direction to engage ground surface 21. +

Stabilization System with Pivotal Foot

Figure 2:
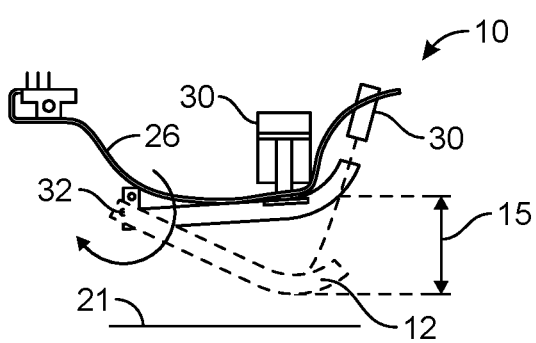
FIG. 2 is a schematic diagram of the stabilization system of FIGS. 1A-1B, according to an exemplary embodiment.

Referring now to FIG. 2, stabilization system 10 is shown, according to another embodiment. Stabilizing member 12 can be pivotally coupled with launch plate 26 at pivot point 32 (e.g., through a pin). Stabilizing member 12 can be deployed by being driven to pivot/rotate about pivot point 32 until stabilizing member 12 contacts, engages, etc., ground surface 21. Stabilizing member 12 can have a generally straight shape, a curved shape, a J-shape, etc., as shown in FIG. 2. Stabilizing member 12 can be selectably and/or adjustably operated to engage ground surface 21 by a linear actuator, a pneumatic actuator, a cylinder, a hydraulic cylinder, an electric linear actuator, an electric motor, an engine, etc., shown as prime mover 30. Prime mover 30 can pivotally couple with launch plate 26 at a first end and pivotally couple with stabilizing member 12 at an opposite or second or distal end. Prime mover 30 can extend to drive stabilizing member 12 to engage ground surface 21, or retract to move stabilizing member 12 out of engagement with ground surface 21. In some embodiments, prime mover 30 operates to extend stabilizing member 12 to pivot such that an end of stabilizing member 12 travels a distance 15 (e.g., five inches) to engage ground surface 21.

Stabilization System with Scissors Mechanism

Figure 3:
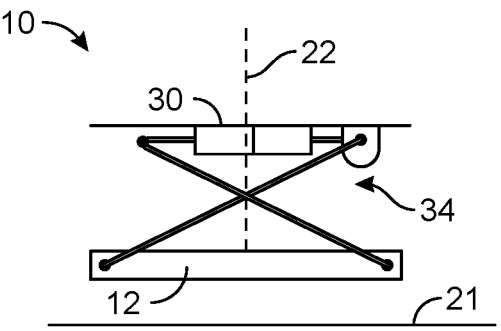
FIG. 3 is a diagram of the stabilization system of FIGS. 1A-1B, according to an exemplary embodiment.

Referring now to FIG. 3, stabilization system 10 is shown, according to another embodiment. Stabilizing member 12 can be fixedly coupled at an end of a scissors mechanism 34 (e.g., a scissors apparatus). Scissors mechanism 34 can be operated by a linear actuator, shown as prime mover 30.

Prime mover 30 can extend and retract to drive scissors mechanism 34 to extend or retract along vertical axis 22. In this way, stabilizing member 12 can be driven by prime mover 30 to move towards ground surface 21 until stabilizing member 12 engages ground surface 21. Stabilizing member 12 can be transitioned between the engaged/extended configuration and the retracted/tucked configuration by operation of prime mover 30.

Stabilization System with Linked Feet

Figure 4:
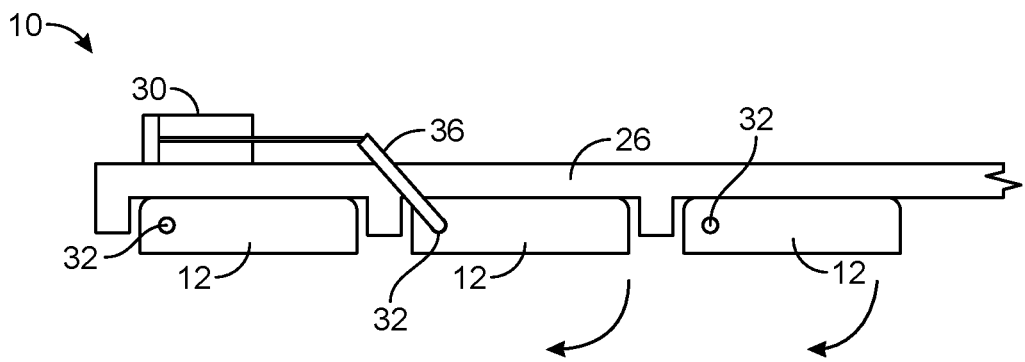
FIG. 4 is a diagram of the stabilization system of FIGS. 1A-1B, according to an exemplary embodiment.

Referring now to FIG. 4, stabilization system 10 is shown according to another embodiment. Stabilization system 10 can include multiple stabilizing members 12, each configured to pivot or rotate about a corresponding rotation or pivot point 32. Stabilizing members 12 can be driven to rotate/pivot about their corresponding pivot points 32 by a linear actuator, shown as prime mover 30. Prime mover 30 can be configured to drive one or more of stabilizing members 12 to pivot/rotate about their corresponding pivot points 32 through a linkage apparatus, a bar, a beam, a link, an elongated member, etc., shown as linkage 36. Linkage 36 can transfer the linear motion of prime mover 30 to rotary/pivotal motion of stabilizing members 12 about their corresponding pivot points 32. In some embodiments, stabilizing members 12 are coupled or linked such that the rotation/pivoting of any of stabilizing members 12 results in a same amount of rotation/pivoting of all other stabilizing members 12. In this way, driving one of stabilizing members 12 to pivot or rotate about its corresponding pivot point 32 causes all the rest of stabilizing members 12 to pivot or rotate about their corresponding pivot point 32. Stabilizing members 12 can be operated by prime mover 30 to pivot/rotate about their corresponding pivot points 32 until stabilizing members 12 (e.g., an outer end) engage ground surface 21.

Figure 5:
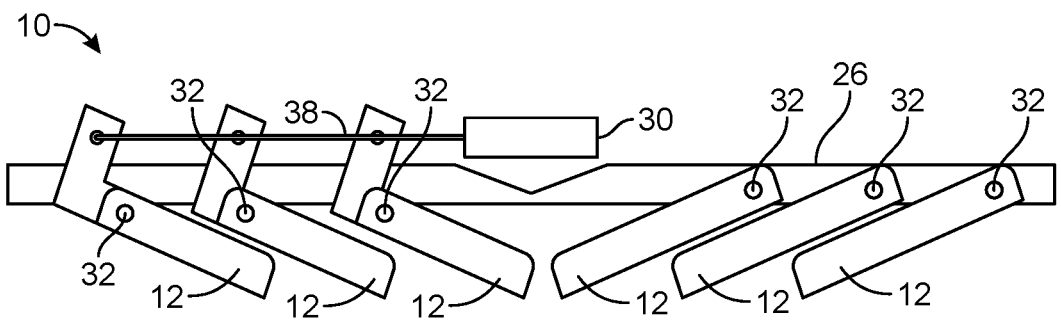
FIG. 5 is a diagram of the stabilization system of FIGS. 1A-1B, according to an exemplary embodiment.

Referring now to FIG. 5, stabilization system 10 is shown according to another embodiment. Stabilization system 10 includes six stabilizing members 12. Particularly, stabilization system 10 includes a first set of three stabilizing members 12 (at a left end of launch plate 26, the left three stabilizing members 12 shown in FIG. 5) and a second set of three stabilizing members 12 (at a right end of launch plate 26, the right three stabilizing members 12 shown in FIG. 5). Stabilizing members 12 are all pivotally coupled with launch plate 26 at pivot points 32 and are configured to pivot/rotate about pivot points 32 to transition stabilization system 10 into the deployed state. The first set of stabilizing members 12 is configured to rotate/pivot in unison about their corresponding/respective pivot points 32 in a first direction (e.g., in a clockwise direction), and the second set of stabilizing members 12 is configured to rotate/pivot in unison about their corresponding/respective pivot points 32 in a second direction that is opposite the first direction (e.g., in a counter-clockwise direction). In this way, the first set of stabilizing members 12 and the second set of stabilizing members 12 may swing outwards for deployment and swing inwards (e.g., towards each other) for tucking or stowage of the stabilizing members 12.

Stabilization system 10 includes a linear actuator, shown as prime mover 30 that is configured to drive at least the first set of stabilizing members 12 to pivot/rotate about their respective pivot points 32. Each of stabilizing members 12 of the first set can be pivotally coupled with an output or extendable shaft 38 (e.g., a bar, a beam, a rod, a conduit, an output shaft, etc.) of prime mover 30. As prime mover 30 operates, extendable shaft 38 can translates in either direction (e.g., along longitudinal axis 20) to deploy stabilizing members 12 (e.g., to drive stabilizing members 12 to rotate/pivot about their corresponding pivot points 32). Extendable shaft 38 may retract (e.g., move to the right as shown in FIG. 5) to drive the first set of stabilizing members 12 to pivot/rotate about their respective pivot points 32 to deploy stabilizing members 12 (e.g., to cause stabilizing members 12 to pivot/rotate in the first direction). Likewise, extendable shaft 38 can extend to retract stabilizing members 12 (e.g., to cause stabilizing members 12 to pivot/rotate in the second direction that is opposite the first direction). The second set of stabilizing members 12 can also be pivotally coupled with extendable shaft 38 on an opposite side of prime mover 30 such that the first and second sets of stabilizing members 12 are driven to deploy or retract in unison. In some embodiments, a similar but mirrored configuration of prime mover 30 and extendable shaft 38 is used to deploy and retract the second set of stabilizing members 12 (e.g., a second prime mover 30 that extends or retracts to drive the second set of stabilizing members 12 to pivot/rotate about their respective pivot points 32 to deploy or retract).

Figure 6:
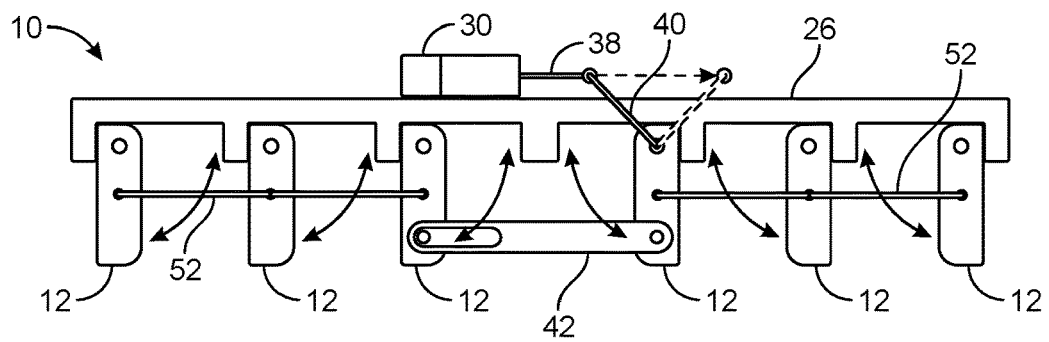
FIG. 6 is a diagram of the stabilization system of FIGS. 1A-1B, according to an exemplary embodiment.

Referring now to FIG. 6, stabilization system 10 can include six stabilizing members 12 pivotally coupled at a first end with launch plate 26 or underside 18 of military vehicle 16. A first set of three stabilizing members 12 (e.g., the left three shown in FIG. 6) are configured to pivot in unison in a first direction (e.g., clockwise) to be transitioned into engagement with ground surface 21 (e.g., to be deployed). A second set of three stabilizing members 12 (e.g., the right three shown in FIG. 6) are configured to pivot in unison in a second direction that is opposite the first direction (e.g., counter-clockwise) to be transitioned into engagement with ground surface 21 (e.g., to be deployed). The first set of three stabilizing members 12 can be pivoted in the second direction to be retracted (e.g., to move out of engagement with ground surface 21). Likewise, the second set of three stabilizing members 12 can be pivoted in the first direction to be retracted (e.g., to move out of engagement with ground surface 21).

All of stabilizing members 12 in the first set can be pivotally coupled with each other through a linkage, a bar, a beam, etc., shown as linkage 52. Similarly, all stabilizing members 12 in the second set can be pivotally coupled with each other through linkage 52. Linkage 52 can be an elongated member that extends between stabilizing members 12 at a centerpoint of stabilizing members 12. Innermost stabilizing members 12 of the first and second set can be coupled through a linkage, a bar, a beam, a member, a connecting member, etc., shown as slotted member 42. Slotted member 42 is pivotally coupled with one of the innermost stabilizing members 12 of the first and second set at a first or proximate end, and slidably and pivotally coupled with the other innermost stabilizing member 12 of the other set (e.g., the second set or the first set) at an opposite end. Slotted member 42 can include a slot at the opposite end that is configured to receive a pin of one of the innermost stabilizing members 12.

The first and second set of stabilizing members 12 can be deployed independently or in unison. For example, a linear actuator, shown as prime mover 30 can be configured to provide translational motion to an intermediate linkage 40 (e.g., through extendable shaft 38). Intermediate linkage 40 (e.g., a bar, a beam, a rod, a rigid member, an elongated member, etc.) can be fixedly coupled with one of stabilizing members 12 of the second set. Since stabilizing members 12 of the second set are all pivotally coupled with each other through linkage 52, driving one of stabilizing members 12 to deploy or retract results in the rest of stabilizing members 12 in the second set also deploying or retracting. In some embodiments, a similar and symmetric prime mover 30 and intermediate linkage 40 are used to independently deploy/retract the first set of stabilizing members 12.

In other embodiments, driving the second set of stabilizing members 12 to deploy causes the first set of stabilizing members 12 to also deploy, or vice versa. Likewise, driving the second set of stabilizing members 12 to retract may cause the first set of stabilizing members to retract, or vice versa. Slotted member 42 can include gears (e.g., a planetary gear set) that convert the translational motion of slotted member 42 to a force that drives the first set of stabilizing members 12 to pivot about their respective pivot points in a direction that is opposite the direction of the second set of stabilizing members 12. For example, if operating prime mover 30 to extend causes the second set of stabilizing members 12 to each pivot about their respective pivot points in a clockwise direction, the gearing between slotted member 42 and the corresponding stabilizing member 12 of the first set may drive the first set of stabilizing members 12 to pivot in a counter-clockwise direction. In this way, the first and the second set of stabilizing members 12 can be operated by a single prime mover 30 to both extend/deploy or retract concurrently.

Recoil Forces

Figure 7:
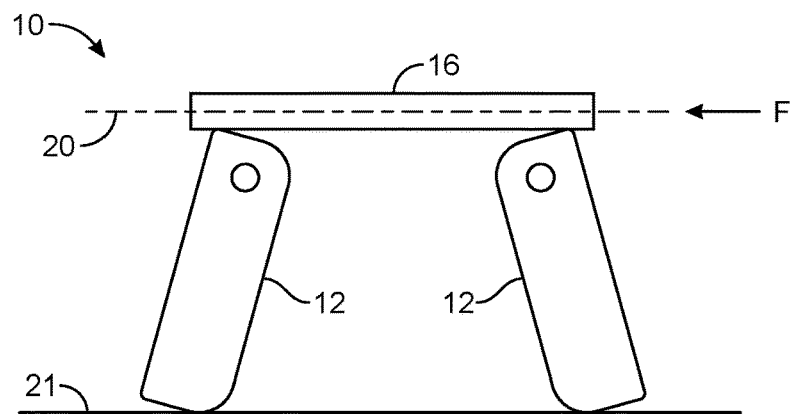
FIG. 7 is a diagram of forces that the stabilization system of FIG. 1A can mitigate, according to an exemplary embodiment.

Referring now to FIG. 7, stabilization system 10 can function to absorb recoil forces applied to military vehicle 16 along longitudinal axis 20 and/or a lateral axis and/or vertical axis 22. Stabilizing members 12 can function as legs, stands, structural support members, etc., and may be angled to absorb recoil forces that result from operating weaponry or ballistics on military vehicle 16. Advantageously, stabilizing members 12 facilitate providing additional support between military vehicle 16 and ground surface 21. This enables stabilizing members 12 to absorb some of the recoil forces, thereby decreasing the likelihood that military vehicle 16 will roll or pitch due to the recoil forces (shown as F in FIG. 7). When ballistics or weaponry are used on military vehicle 16, rolling or pitching of military vehicle 16 can compromise the accuracy of the ballistics or weaponry. For example, military vehicle 16 may pitch or roll slightly before the missile exits the ballistic device. This can alter the trajectory of the missile and may negatively affect the operation of the ballistics on military vehicle 16. Advantageously, stabilizing members 12 absorb at least some of the recoil forces that result from operating ballistics or weaponry, thereby improving the accuracy of said ballistics or weaponry.

Figure 8:
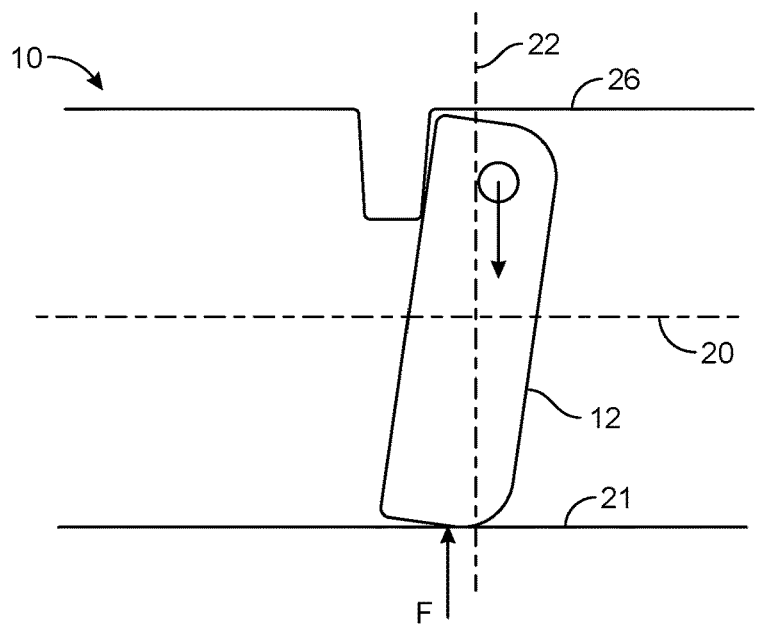
FIG. 8 is a diagram of forces that act upon a member of the stabilization system of FIG. 1A during ballistic operations of the military vehicle, according to an exemplary embodiment.

Referring now to FIG. 8, a free body diagram of one of stabilizing members 12 of any of the embodiments of stabilization system 10 of FIG. 2, or 4-7 is shown, according to an exemplary embodiment. Stabilizing members 12 can be angled relative to vertical axis 22 to provide additional stability for military vehicle 16. Stabilizing members 12 provide additional reactionary forces F due to engaging ground surface 21.

Stationary Stabilization System

Figure 9:
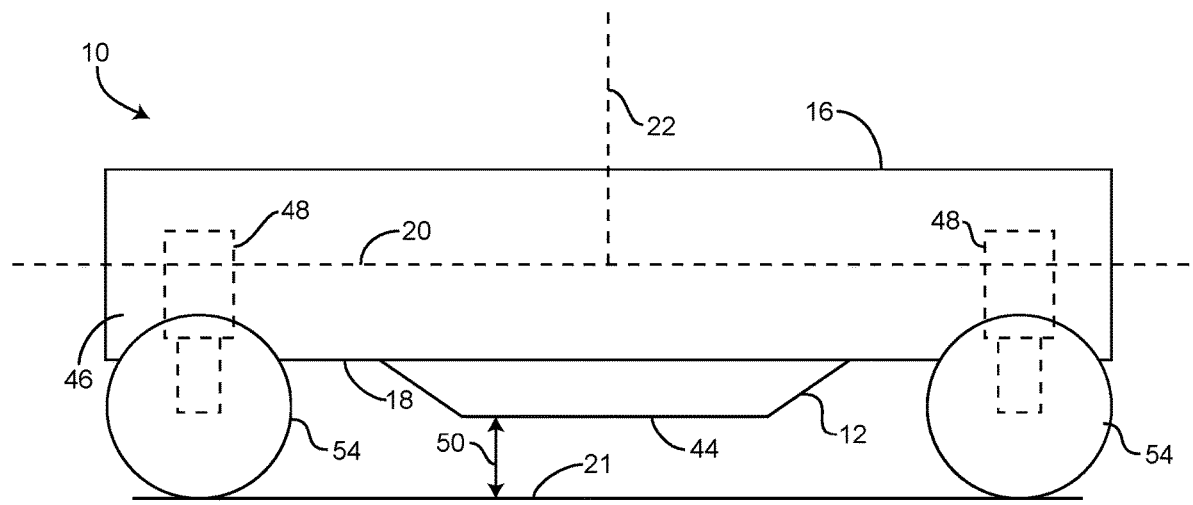
FIG. 9 is a block diagram of a stabilization system with a fixed support member in a disengaged state, according to an exemplary embodiment.
Figure 10:
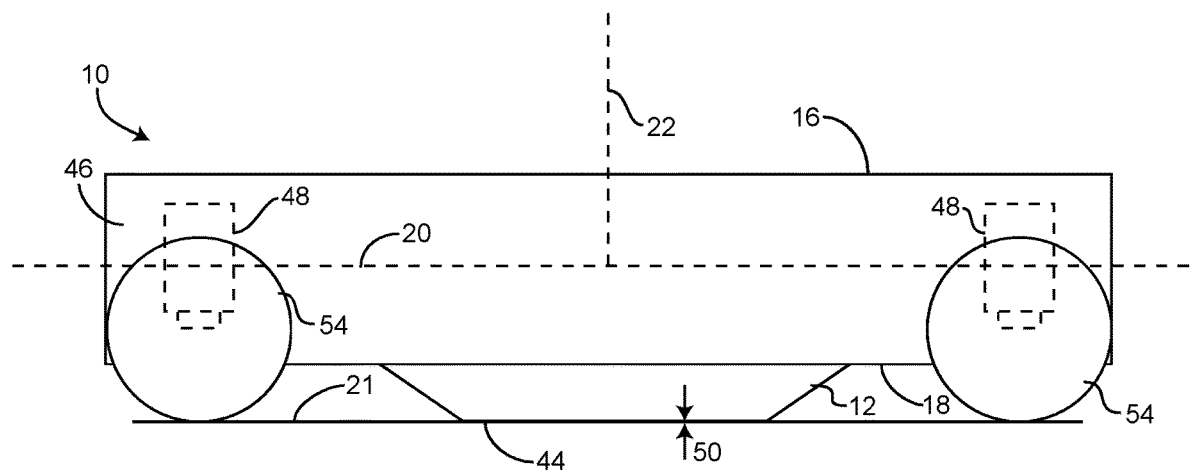
FIG. 10 is a block diagram of the stabilization system of FIG. 9 in an engaged state, according to an exemplary embodiment.
Figure 11:
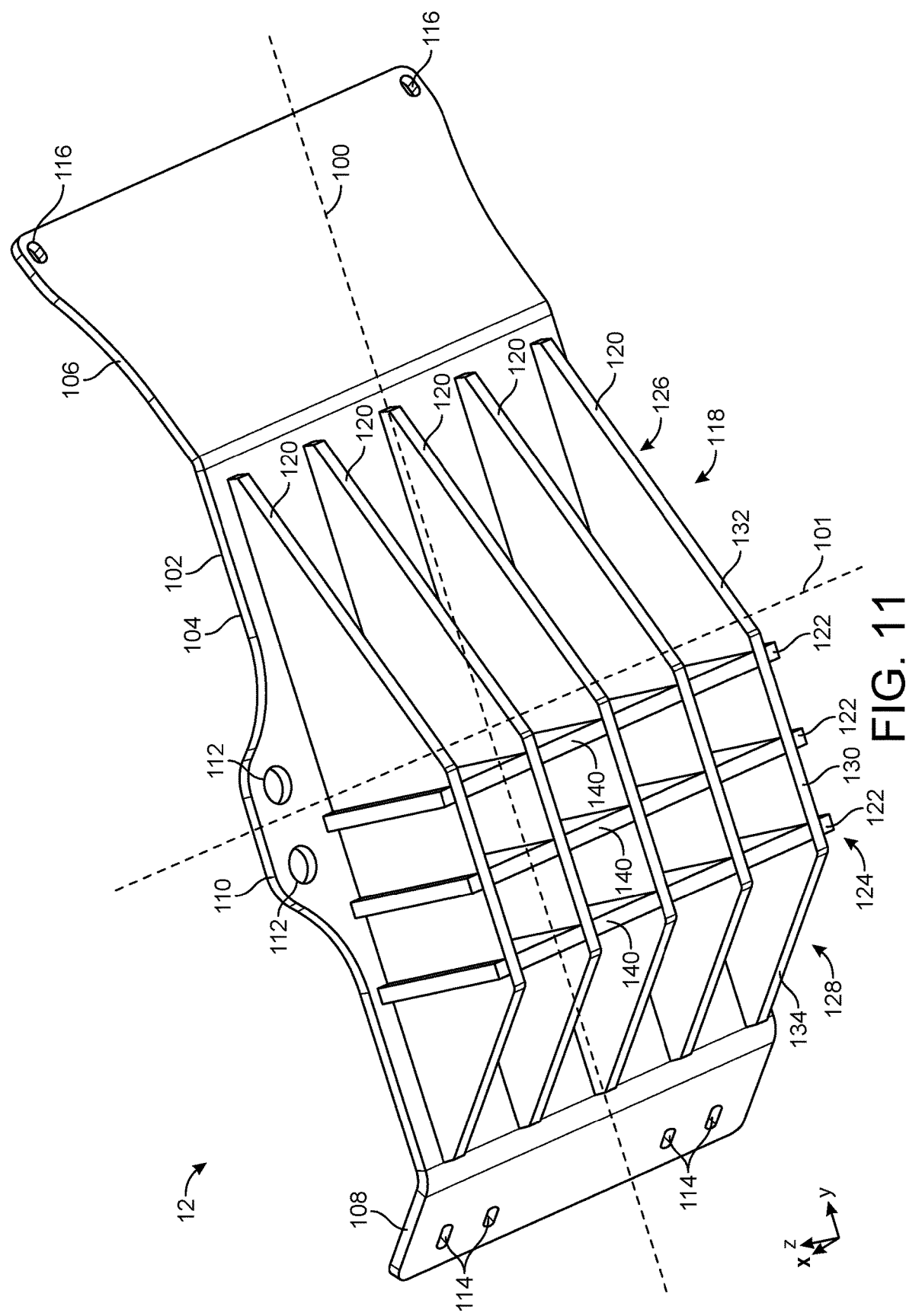
FIG. 11 is a perspective view of the support member of the stabilization system of FIG. 9, according to an exemplary embodiment.
Figure 12:
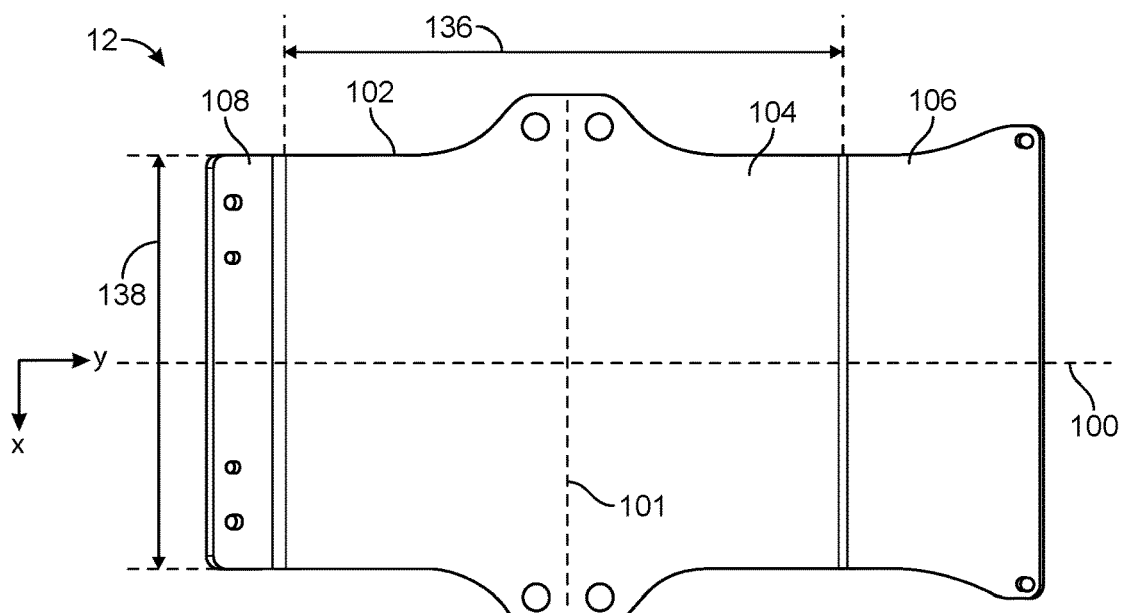
FIG. 12 is a top view of the support member of the stabilization system of FIG. 9, according to an exemplary embodiment.
Figure 13:
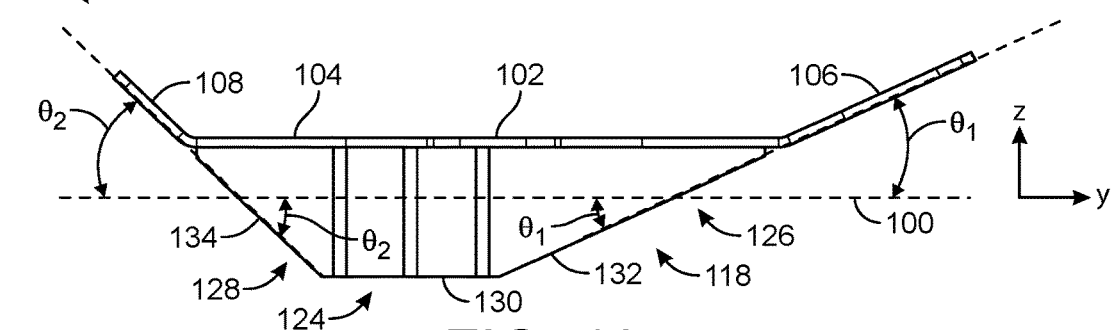
FIG. 13 is a side view of the support member of the stabilization system of FIG. 9, according to an exemplary embodiment.
Figure 14:
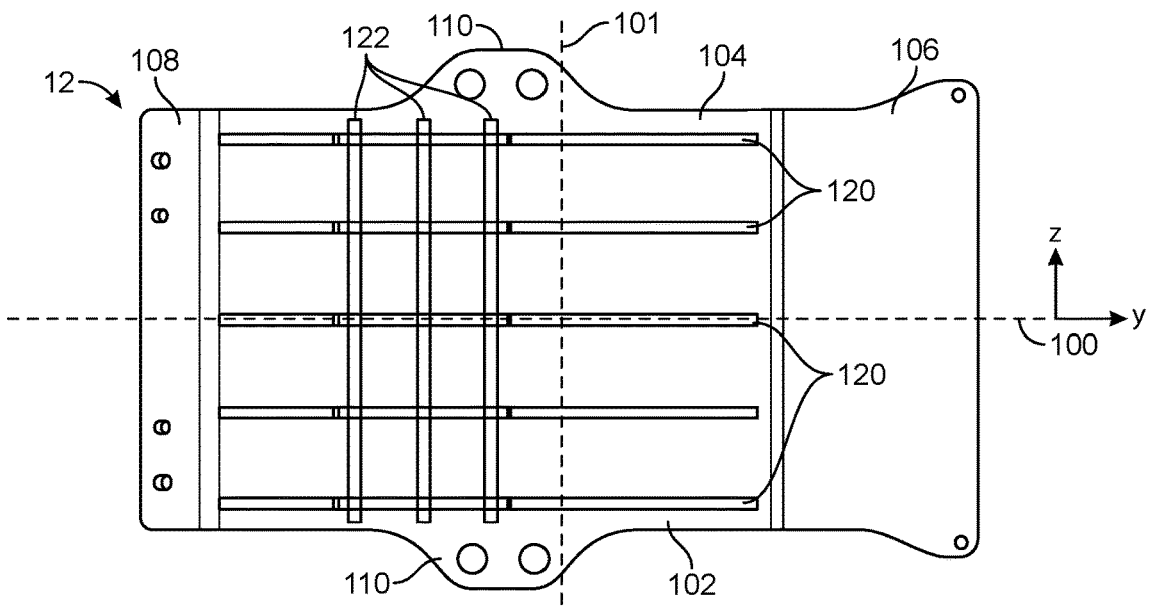
FIG. 14 is a bottom view of the support member of the stabilization system of FIG. 9, according to an exemplary embodiment.

Referring now to FIGS. 9 and 10, stabilization system 10 is shown according to another embodiment. In some embodiments, stabilizing member 12 is fixedly coupled with underside 18 of military vehicle 16. Stabilizing member 12 can be fixedly coupled with underside 18 of military vehicle 16 similarly to launch plate 26. For example, stabilizing member 12 can be fixedly and/or removably coupled with underside 18 of military vehicle 16 with fasteners, a weld, etc.

Stabilizing member 12 can include a lower surface, an engagement surface, a bottom surface, a face, a periphery, an edge, etc., shown as engagement surface 44. Engagement surface 44 is configured to selectively or adjustably engage ground surface 21 to provide additional stability for military vehicle 16 during ballistic operations.

Engagement surface 44 can be configured to selectively engage ground surface 21 in response to lowering or raising (e.g., adjustment in height) of military vehicle 16. Specifically, a body 46 of military vehicle 16 may raise or lower to facilitate engagement or contact (e.g., direct contact) between engagement surface 44 and ground surface 21. In some embodiments, military vehicle 16 includes one or more dampers, pistons, air pistons, hydraulic pistons, cylinders, etc., shown as suspension elements 48. Suspension elements 48 can be extendable or retractable and are configured to absorb impacts or impulses transferred through body 46 and/or one or more wheels, tires, tracks, treads, drive members, etc., shown as tractive elements 54.

Suspension elements 48 can be retracted/extended to selectively decrease or increase a distance 50 between engagement surface 44 of stabilizing member 12 and ground surface 21 as shown in FIGS. 9 and 10. Suspension elements 48 may be adjusted to retract in response to a user input. In some embodiments, suspension elements 48 include a chamber filled with a compressed air or a fluid. The chamber can be evacuated at least partially with the air or the fluid to retract suspension elements 48 to thereby lower body 46 of military vehicle 16 until engagement surface 44 is in direct contact or engages ground surface 21. Distance 50 can be decreased until it is substantially equal to zero and engagement surface 44 contacts ground surface 21. When engagement surface 44 contacts ground surface 21 as shown in FIG. 10, stabilizing member 12 provides additional stability for military vehicle 16 and absorbs at least some of the impact, recoil, roll, etc., resulting from operating weaponry or ballistic devices on military vehicle 16.

Launch Plate

Referring now to FIGS. 11-26, stabilizing member 12 is shown in greater detail according to various exemplary embodiments. Any combination of features, configurations, geometry, etc., of the various exemplary embodiments of stabilizing member 12 as shown in FIGS. 11-26 should be understood to be within the scope of the present application.

Referring particularly to FIGS. 11-14, stabilizing member 12 can include a body portion, a body member, a frame portion, a base portion, a carriage, etc., shown as body 102. Body 102 includes a flat portion, a main portion, a substantially flat member, a planar member, a middle portion, a plate, etc., shown as medial portion 104. Medial portion 104 can be a substantially flat planar member. Medial portion 104 can have a generally rectangular or square shape with a thickness.

Body 102 also includes a first angled portion, a first protrusion, a first angled planar member, a first angled plate, a first angled member, etc., shown as first angled portion 106. In some embodiments, first angled portion 106 is integrally formed with medial portion 104. In some embodiments, first angled portion 106 extends in a first direction from a first end of medial portion 104. Body 102 can also include a second angled portion 108 disposed at an opposite or second end of medial portion 104. In some embodiments, second angled portion 108 is integrally formed with medial portion 104 at the second or opposite end of medial portion 104.

Medial portion 104 can define a longitudinal axis 100 that extends therethrough. In some embodiments, medial portion 104 also defines a lateral axis 101 that is substantially perpendicular to longitudinal axis 100. Longitudinal axis 100 of stabilizing member 12 can be substantially parallel with longitudinal axis 20 of military vehicle 16. Longitudinal axis 100 can define a forwards and rearwards direction (e.g., a positive and negative y-direction as shown). Likewise, lateral axis 101 can define a left and right direction (e.g., a positive and negative x-direction as shown). A vertical axis may extend through the intersection of lateral axis 101 and longitudinal axis 100 that is perpendicular to both longitudinal axis 100 and lateral axis 101. The vertical axis can define an upwards and downwards direction (e.g., a positive and negative z-direction as shown). First angled portion 106 and second angled portions 108 can be substantially parallel to lateral axis 101. Additionally, first angled portion 106 and second angled portion are angled at $\theta_1$ and $\theta_2$ relative to longitudinal axis 100, respectively. In some embodiments, first angled portion 106 extends further than second angled portion 108.

The value of angle $\theta_1$ may be substantially equal to the value of angle $\theta_2$. In other embodiments, the value of angle $\theta_1$ is less than the value of angle $\theta_2$. In other embodiments, the value of angle $\theta_1$ is greater than the value of angle $\theta_2$. In some embodiments, the value of angle $\theta_1$ is substantially 24 or 25 degrees. In some embodiments, the value of angle $\theta_2$ is substantially 44 or 45 degrees.

First angled portion 106 can include one or more apertures 116 (e.g., openings, holes, bores, slots, voids, etc.) that extend therethrough. In some embodiments, apertures 116 are disposed at corners of first angled portion 106. Apertures 116 facilitate removably and fixedly coupling stabilizing member 12 to underside 18 of military vehicle 16.

Second angled portion 108 can also include one or more apertures 114 (e.g., openings, holes, bores, slots, voids, etc.). In some embodiments, second angled portion 108 includes multiple sets of apertures 114. For example, second angled portion 108 can include a first set of apertures 114 at a first corner of second angled portion 108, and a second set of apertures 114 at an opposite or distal corner of second angled portion 108. Apertures 114 can function similarly to apertures 116 and facilitate removably and fixedly coupling stabilizing member 12 with underside 18 of military vehicle 16.

Stabilizing member 12 also includes one or more support members 118 (e.g., compressive load bearing members). Support members 118 can be truss members, trapezoidal members, structural members, load bearing members, compressive load bearing members, planar members, ribs, etc., that extend from an underside of stabilizing member 12. In some embodiments, support members 118 extend from an underside of medial portion 104. Support members 118 can be configured to engage a ground surface (e.g., ground surface 21) to facilitate providing additional structural strength to military vehicle 16.

Support members 118 each include a longitudinally extending member 120 (e.g., a support member, a cross-member). Longitudinally extending members 120 can be spaced evenly apart and are all substantially parallel with each other. Longitudinally extending members 120 can have a trapezoidal shape. Stabilizing member 12 also includes laterally extending members 122 (e.g., support members, cross-members, etc.). Laterally extending members 122 can be substantially perpendicular to or orthogonal to longitudinally extending members 120. Laterally extending members 122 can extend between adjacent or neighboring longitudinally extending members 120. Advantageously, laterally extending members 122 facilitate improved load and shock absorbing capabilities of support members 118.

Laterally extending members 122 and longitudinally extending members 120 can be integrally formed with each other or otherwise fixedly coupled with each other (e.g., welded). Longitudinally extending members 120 can at least partially form or define or include a flat portion 124, a first angled portion 126 that is proximate first angled portion 106, and a second angled portion 128 that is proximate second angled portion 108. In some embodiments, flat portion 124 is a smaller base of the trapezoidal shape of longitudinally extending members 120. Likewise, first angled portion 126 and second angled portion 128 of longitudinally extending members 120 are the first and second legs of the trapezoidal shape of longitudinally extending members 120.

Flat portion 124 includes a flat or planar surface 130 that is substantially parallel with longitudinal axis 100 and/or medial portion 104. In some embodiments, planar surface 130 is non-parallel with longitudinal axis 100 (e.g., if planar surface 130 includes curvature or is sloped). First angled portion 126 of longitudinally extending member 120 includes a surface 132 that is substantially co-axial, co-planar, etc., with a surface, edge, periphery, centerline, etc., of first angled portion 106. Likewise, second angled portion 128 of longitudinally extending member 120 includes surface 134 that is substantially co-axial, co-planar, etc., with a surface, edge, periphery, centerline, etc., of second angled portion 108 (shown in FIG. 13).

Laterally extending members 122 can each include a lower, bottom, or engagement surface 140. Engagement surface 140 of laterally extending members 122 can be substantially flat, and may be coplanar with surface 130 of longitudinally extending members 120. Engagement surface 140 of laterally extending members 122 and surface 130 of longitudinally extending members 120 can cooperatively define engagement surface 44 of stabilizing member 12.

Medial portion 104 can have an overall longitudinal length 136. In an exemplary embodiment, longitudinal length 136 is 24 inches. In other embodiments, longitudinal length 136 is greater than or less than 24 inches. Medial portion 104, first angled portion 106, and second angled portion 108 can have a lateral width 138. First angled portion 106, second angled portion 108, and medial portion 104 can all have the same lateral width 138. In an exemplary embodiment, lateral width 138 is 17 inches.

Medial portion 104 includes one or more laterally extending attachment portions, tabs, protrusions, flanges, etc., shown as attachment portions 110. Attachment portions 110 can extend laterally from opposite sides, surfaces, edges, etc., of medial portion 104. Attachment portions 110 each include one or more apertures 112 (e.g., openings, holes, bores, slots, voids, etc.). Apertures 112 are configured to facilitate removable and fixed coupling between stabilizing member 12 and underside 18 of military vehicle 16. In some embodiments, apertures 112 are configured to receive apertures therethrough to removably and fixedly couple stabilizing member 12 with underside 18 of military vehicle 16.

Figure 15:
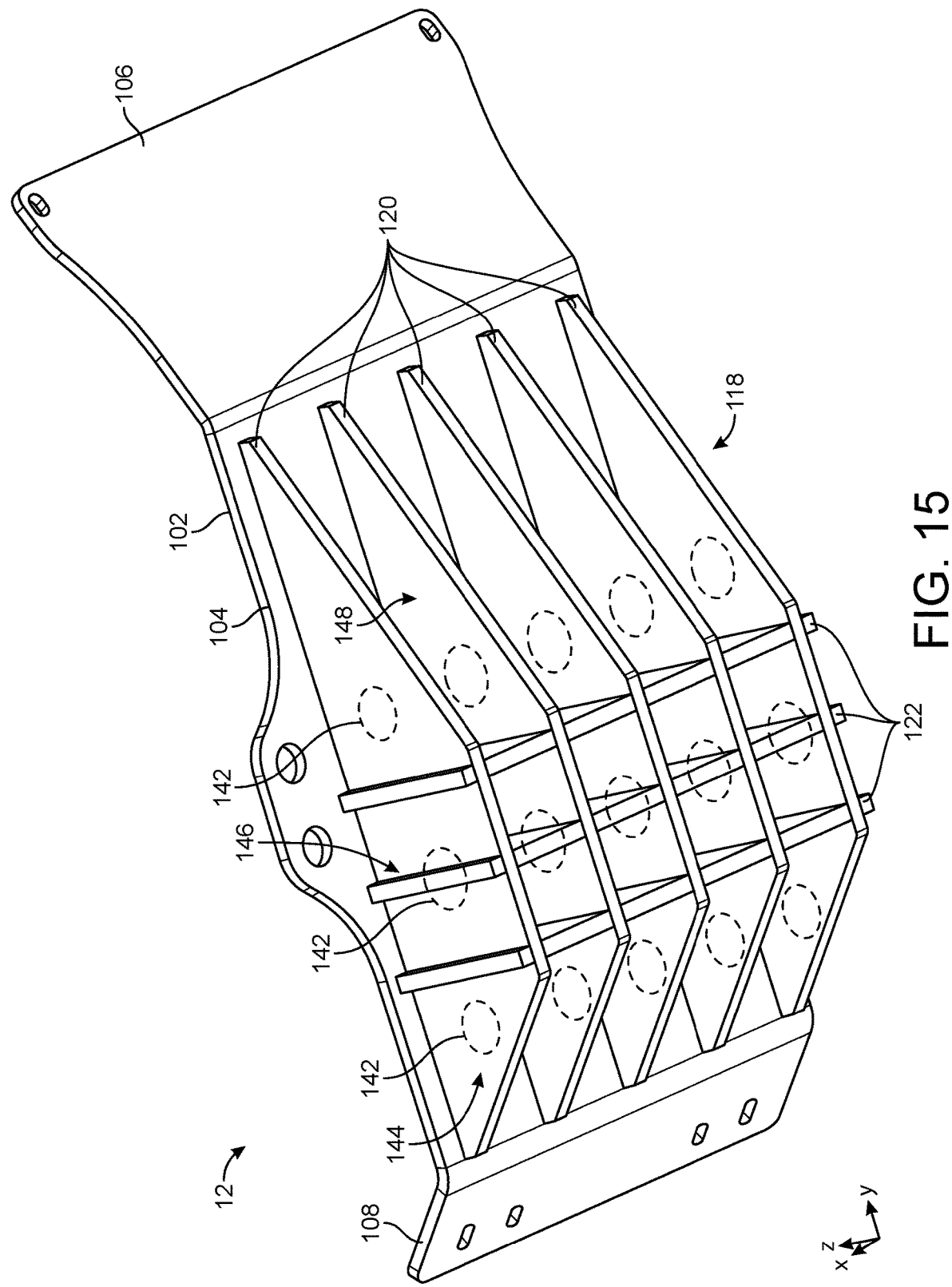
FIG. 15 is a perspective view of the support member of the stabilization system of FIG. 9 with weight reducing apertures, according to an exemplary embodiment.
Figure 17:
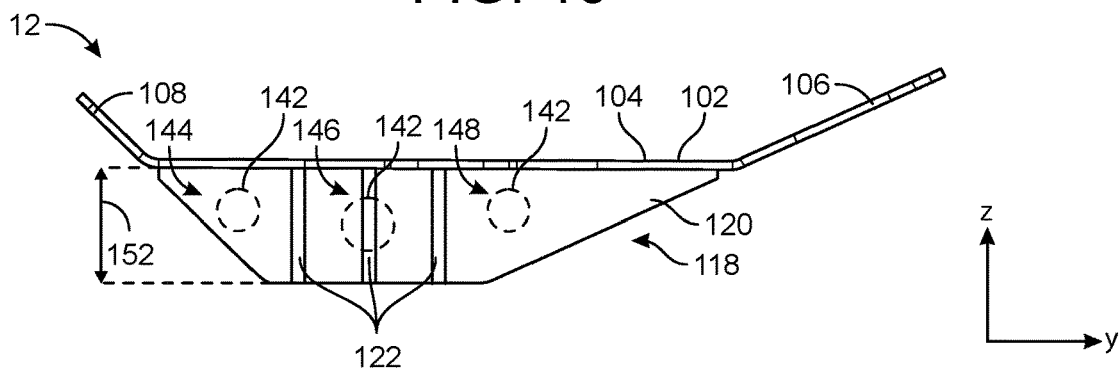
FIG. 17 is a side view of the support member of FIG. 15 with the weight reducing apertures, according to an exemplary embodiment.
Figure 18:
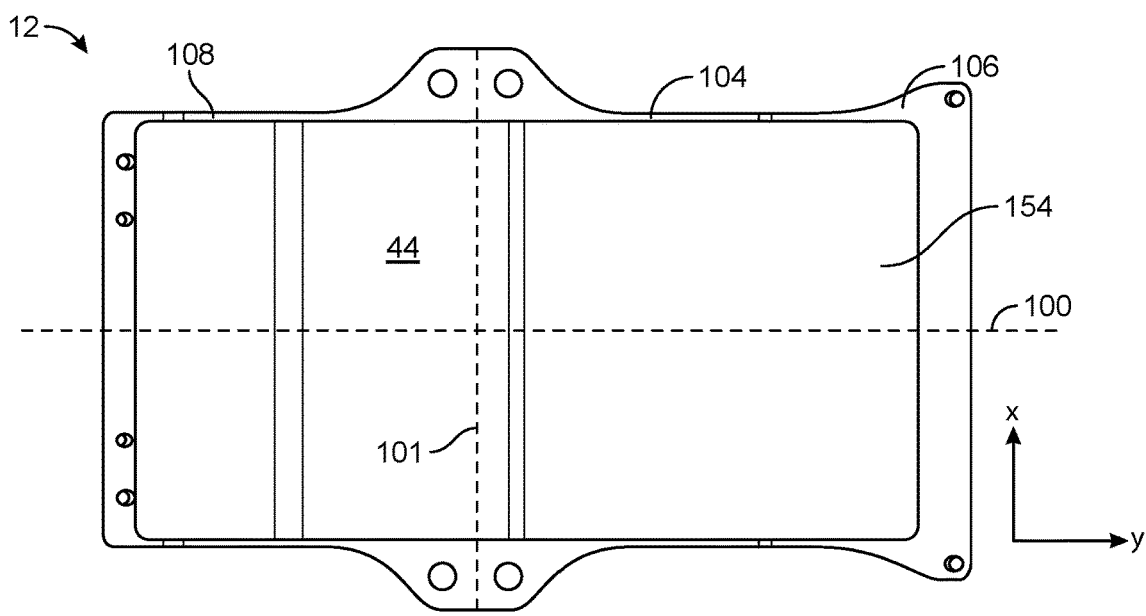
FIG. 18 is a bottom view of the support member of FIG. 9 with an additional plate, according to an exemplary embodiment.

Referring now to FIGS. 15 and 17, stabilizing member 12 is shown, according to another embodiment. Stabilizing member 12 can include a first set 144 of apertures, holes, recesses, cut-outs, voids, spaces, cavities, etc., shown as apertures 142. Stabilizing member 12 can also include a second set 146 of apertures 142, and a third set 148 of apertures 142. Each apertures 142 of set 144, set 146, and set 148 extends laterally through longitudinally extending members 120. Set 144, set 146, and set 148 of apertures 142 can be positioned as shown in FIG. 15. In other embodiments, sets 144, set 146, and set 148 of apertures 142 are centered along longitudinal axis 100. Apertures 142 can have a uniform diameter, radius, shape, size, etc. In other embodiments, apertures 142 have a non-uniform diameter, radius, shape, size, etc. For example, apertures 142 may be circular, elliptical, square, hexagonal, irregularly shaped, etc., or any other shape. First set 144 of apertures 142 may have a first size, shape, diameter, radius, etc., while second set 146 and third set 148 of apertures 142 have different sizes, shapes, diameters, radiuses, etc. Apertures 142 can each extend through substantially an entire thickness (e.g., a lateral thickness) of longitudinally extending members 120 or partially through the entire thickness of longitudinally extending member 120. In some embodiments, apertures 142 are all coaxial with other apertures 142 in a corresponding one of set 144, set 146, and/or set 148. For example, all apertures 142 of first set 144 can be co-axial with each other along a laterally extending axis or centerline.

Advantageously, the material removed at apertures 142 facilitates a lighter stabilizing member 12. Since stabilizing member 12 is fixedly coupled with military vehicle 16, reducing weight of stabilizing member 12 facilitates improved efficiency of military vehicle 16 during transportation. Additionally, apertures 142 can change stress concentrations through longitudinally extending members 120 to improve load bearing capabilities of stabilizing member 12. In some embodiments, laterally extending members 122 include other apertures, voids, cavities, spaces, recessed areas, etc.

Figure 16:
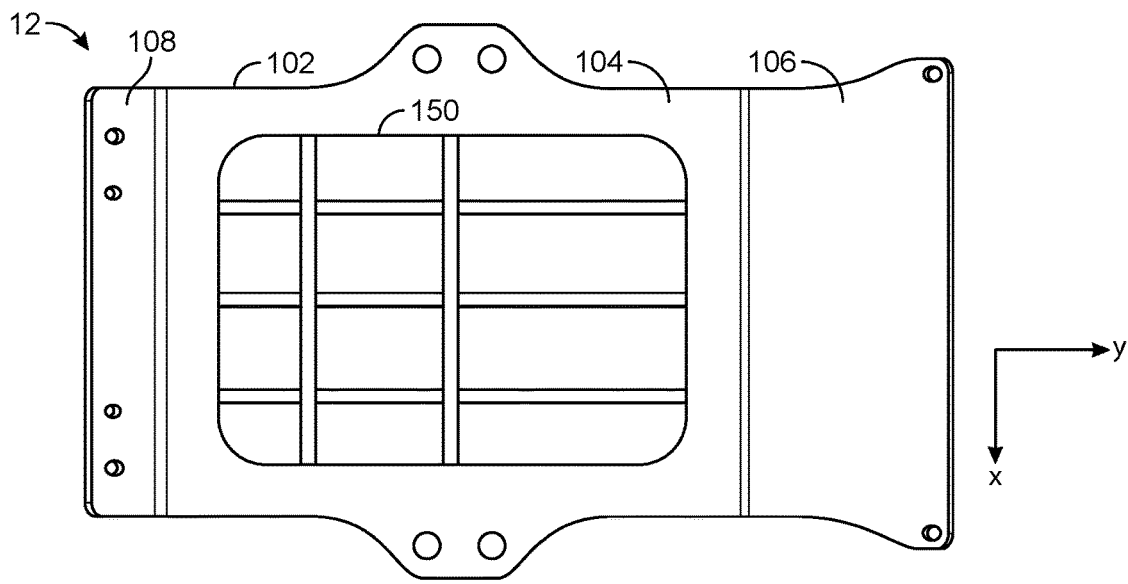
FIG. 16 is a top view of the support member of the stabilization system of FIG. 9 with a weight reducing opening, according to an exemplary embodiment.

Referring particularly to FIG. 16, medial portion 104 can include an aperture, an opening, a hole, a window, a space, a recess, a void, etc., shown as opening 150. Opening 150 can have a generally rectangular shape, a generally square shape, etc. In some embodiments, opening 150 is a rectangular shape with rounded corners. Opening 150 can extend at least partially (or completely) through a thickness of medial portion 104. Advantageously, opening 150 facilitates a lighter stabilizing member 12. For example, the material removed from stabilizing member 12 at opening 150 may reduce weight and facilitate the benefits described in greater detail above with reference to FIG. 15 without significantly compromising the load bearing capabilities of stabilizing member 12.

Referring particularly to FIG. 17, longitudinally extending member 120 can have a maximum or greatest vertical height 152. In some embodiments, vertical height 152 is five inches. Vertical height 152 can be measured between a bottom or lower surface of medial portion 104 and surface 130 of longitudinally extending members 120. In some embodiments, the bottom or lower surface of medial portion 104 and surface 130 are planar surfaces that are parallel to each other.

Referring again to FIGS. 11-14, stabilizing member 12 can be manufactured from steel and may have a weight of approximately 64 pounds. The weight of stabilizing member 12 can be further reduced to be less than 64 pounds if stabilizing member 12 includes apertures 142 and/or opening 150. Advantageously, stabilizing member 12 as shown in FIGS. 11-14 facilitates providing additional stability to military vehicle 16 with low weight.

Referring now to FIGS. 18-22, stabilizing member 12 is shown, according to another embodiment. Stabilizing member 12 includes a covering, a plate, a bent plate, a planar member, a structural member, etc., shown as plate 154. Plate 154 is fixedly coupled with laterally extending members 122 and longitudinally extending members 120. Plate 154 can be removably and fixedly coupled with laterally extending members 122 and longitudinally extending members 120 (e.g., through fasteners) or welded with laterally extending members 122 and longitudinally extending members 120. Plate 154 can include engagement surface 44 for contacting and engaging ground surface 21. Plate 154 can have a lateral width that extends between or beyond outermost longitudinally extending members 120.

Plate 154 includes a flat portion 156, a first angled portion 158, and a second angled portion 160. First angled portion 158 can be angled at $\theta_1$ relative to longitudinal axis 100. Second angled portion 160 can be angled at $\theta_2$ relative to longitudinal axis 100. First angled portion 158 can substantially cover and extend along surfaces 132 of longitudinally extending members 120. Likewise, flat portion 156 can be adjacent (e.g., in contact with, spaced a distance apart, parallel with, fixedly coupled with, extend along, etc.) surfaces 130 of longitudinally extending member 120 and surfaces 140 of laterally extending members 122. Second angled portion 160 can substantially cover and extend along surfaces 134 of longitudinally extending members 120. An outermost or bottom surface of flat portion 156 is engagement surface 44 that contacts or engages ground surface 21. In some embodiments, outer surfaces of first angled portion 158 and second angled portion 160 of plate 154 are also configured to contact ground surface 21 (e.g., if ground surface 21 is sloped).

Plate 154 can have a general shape that corresponds to the shape of longitudinally extending member 120 such that plate 154 fits or interfaces with external surfaces of longitudinally extending members 120. In some embodiments, first angled portion 158 of plate 154 extends in a direction that is substantially parallel with first angled portion 106 of body 102. Likewise, second angled portion 160 can extend in a direction that is substantially parallel with second angled portion 108. Second angled portion 160 and first angled portion 158 of plate 154 can extend beyond longitudinally extending member 120. At least a portion of first angled portion 158 of plate 154 can extend along or be adjacent to or contact a corresponding portion of first angled portion 106 of body 102. Likewise, at least a portion of second angled portion 160 of plate 154 can extend along or be adjacent to or contact a corresponding portion of second angled portion 108 of body 102. In some embodiments, an inner surface of plate 154 directly contacts corresponding surfaces of first angled portion 106 and second angled portion 108 of body 102 (shown in FIG. 22).

Figure 19:
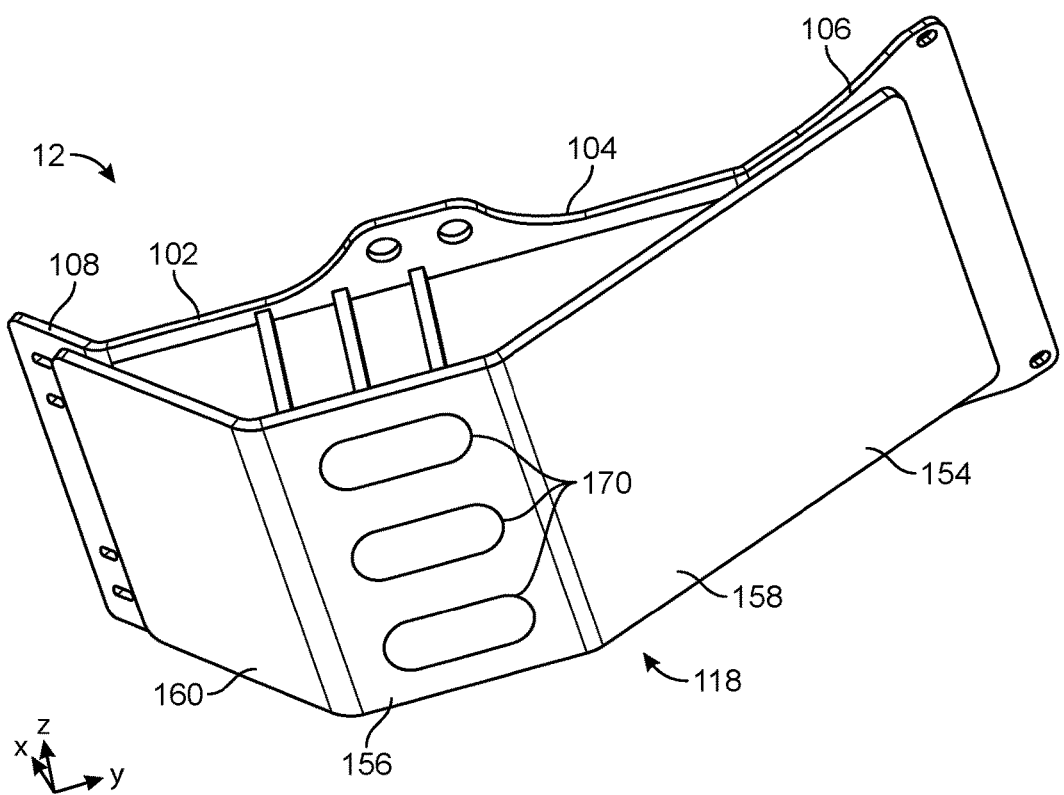
FIG. 19 is a perspective view of the support member of FIG. 18 with one or more drains, according to an exemplary embodiment.

Referring particularly to FIG. 19, flat portion 156 can include one or more apertures, slots, holes, openings, windows, spaces, etc., shown as slots 170. Slots 170 are configured to fluidly couple an external environment with inner volumes defined between corresponding or neighboring longitudinally extending members 120 and/or corresponding or neighboring laterally extending member 122. Slots 170 facilitate reduced weight of stabilizing member 12. Slots 170 can also function as outlets or drains for fluid that may be within the inner volumes defined between longitudinally extending members 120 and/or laterally extending members 122. Advantageously, if fluid is trapped within the inner volumes, slots 170 can facilitate the egress of fluid, thereby ensuring that fluid, contaminants, objects, etc., do not buildup therewithin. Slots 170 can be laterally spaced apart on flat portion 156.

Figure 20:
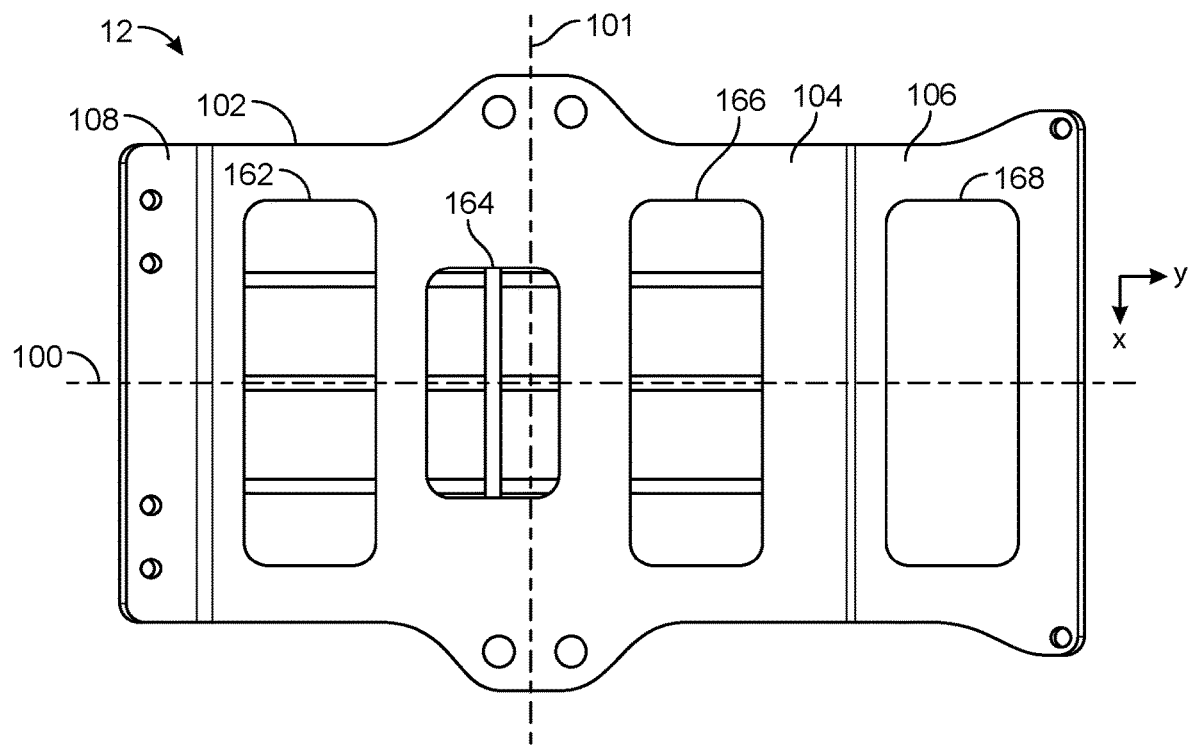
FIG. 20 is a top view of the support member of FIG. 18 with one or more weight reducing openings, according to an exemplary embodiment.
Figure 21:
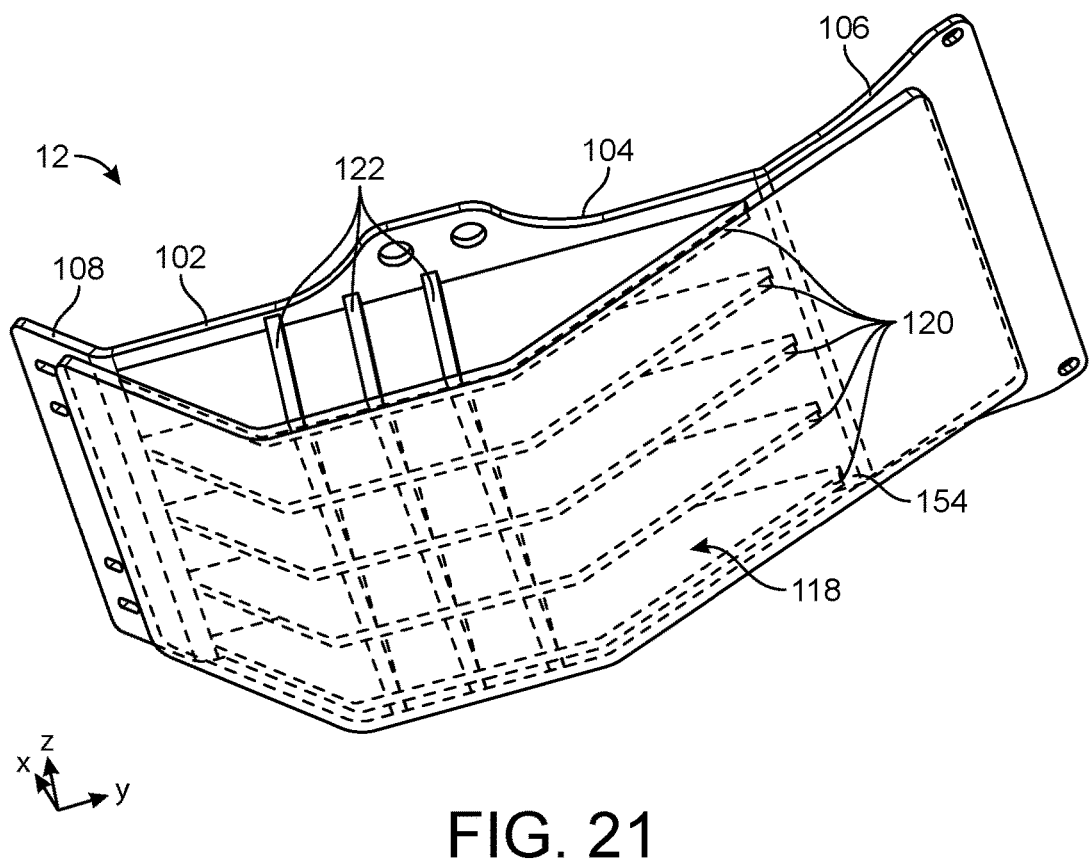
FIG. 21 is a perspective view of the support member of FIG. 18, according to an exemplary embodiment.
Figure 22:
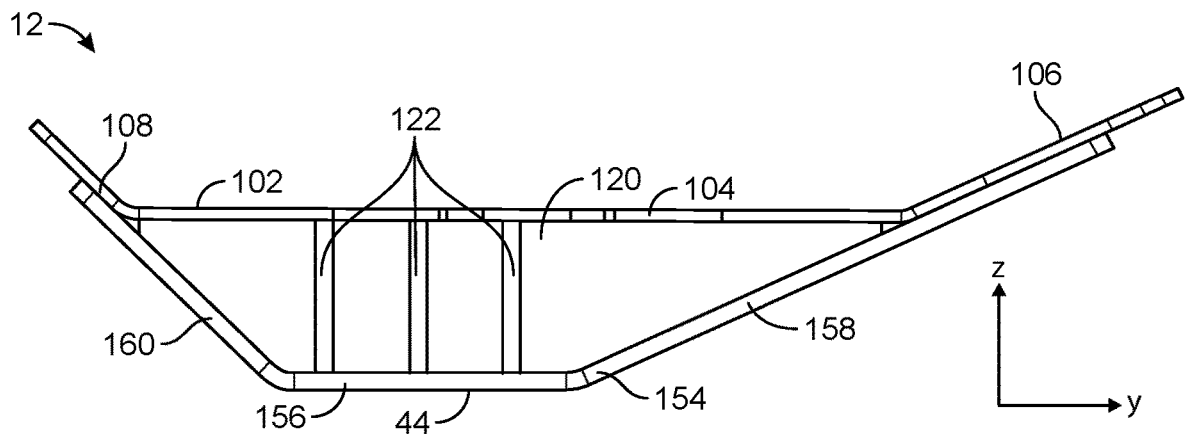
FIG. 22 is a side view of the support member of FIG. 18, according to an exemplary embodiment.

Referring particularly to FIG. 20, body 102 can include one or more openings, windows, apertures, holes, spaces, voids, etc., shown as window 162, window 164, window 166, and window 168. Window 162, window 164, window 166, and window 168 can each be centrally located along longitudinal axis 100. Window 162, window 164, window 166, and window 168 can each have a generally rectangular shape with rounded corners. In some embodiments, a lateral width of window 162, window 164, window 166, and window 168 is uniform. In other embodiments, the lateral width of window 162, window 164, window 166, and window 168 is non-uniform (as shown in FIG. 20). One or more of window 162, window 164, window 166, and window 168 can be disposed on medial portion 104 of body 102. For example, window 162, window 164, and/or window 166 may each extend through an entire thickness of medial portion 104 of body 102. Window 168 can extend through an entire thickness of first angled portion 106 of body 102. Second angled portion 108 can also include a window similar to any of window 162, window 164, window 166, or window 168. Advantageously, window 162, window 164, window 166, and window 168 facilitate reducing the weight of stabilizing member 12. The embodiment of stabilizing member 12 shown in FIGS. 18-22 may have a weight of (approximately) 90 pounds or less.

Referring particularly to FIGS. 23-26, stabilizing member 12 is shown according to another embodiment. Stabilizing member 12 can include a reduced number of laterally extending members 122. For example, stabilizing member 12 may include only two laterally extending members 122 as shown in FIGS. 23-26. In other embodiments, stabilizing member 12 includes more than two laterally extending members 122. Laterally extending members 122 can be spaced a longitudinal distance 172 apart.

Longitudinally extending members 120 can each include a first aperture 176, a second aperture 178, and a third aperture 180. Apertures 176-180 can extend through an entire lateral thickness of the corresponding longitudinally extending member 120. Apertures 176-180 can be circular with non-uniform diameters or radiuses. For example, aperture 176 may have a smallest diameter, aperture 178 may have a largest diameter, and aperture 180 can have a diameter that is greater than the diameter of aperture 176 but less than the diameter of aperture 178. Aperture 180 can be disposed/positioned/located at or near a first end of longitudinally extending member 120. Aperture 176 can be disposed/positioned/located at or near a second end of longitudinally extending member 120 that is opposite the first end of longitudinally extending member 120. In some embodiments, the first end of longitudinally extending member 120 is the end that is proximate or nearest first angled portion 106 of body 102. Likewise, the second end of longitudinally extending member 120 is the end that is proximate or nearest second angled portion 108 of body 102. Aperture 178 can be located at an approximate centerpoint of longitudinally extending member 120. In some embodiments, aperture 178 is located between laterally extending members 122 (e.g., centrally located therebetween).

Apertures 176 of various longitudinally extending members 120 may all be centrally located on a first common lateral axis. Likewise, apertures 180 of various longitudinally extending members 120 can be located on a second common lateral axis. Similarly, apertures 178 of various longitudinally extending member 120 are located on third common lateral axis.

Figure 23:
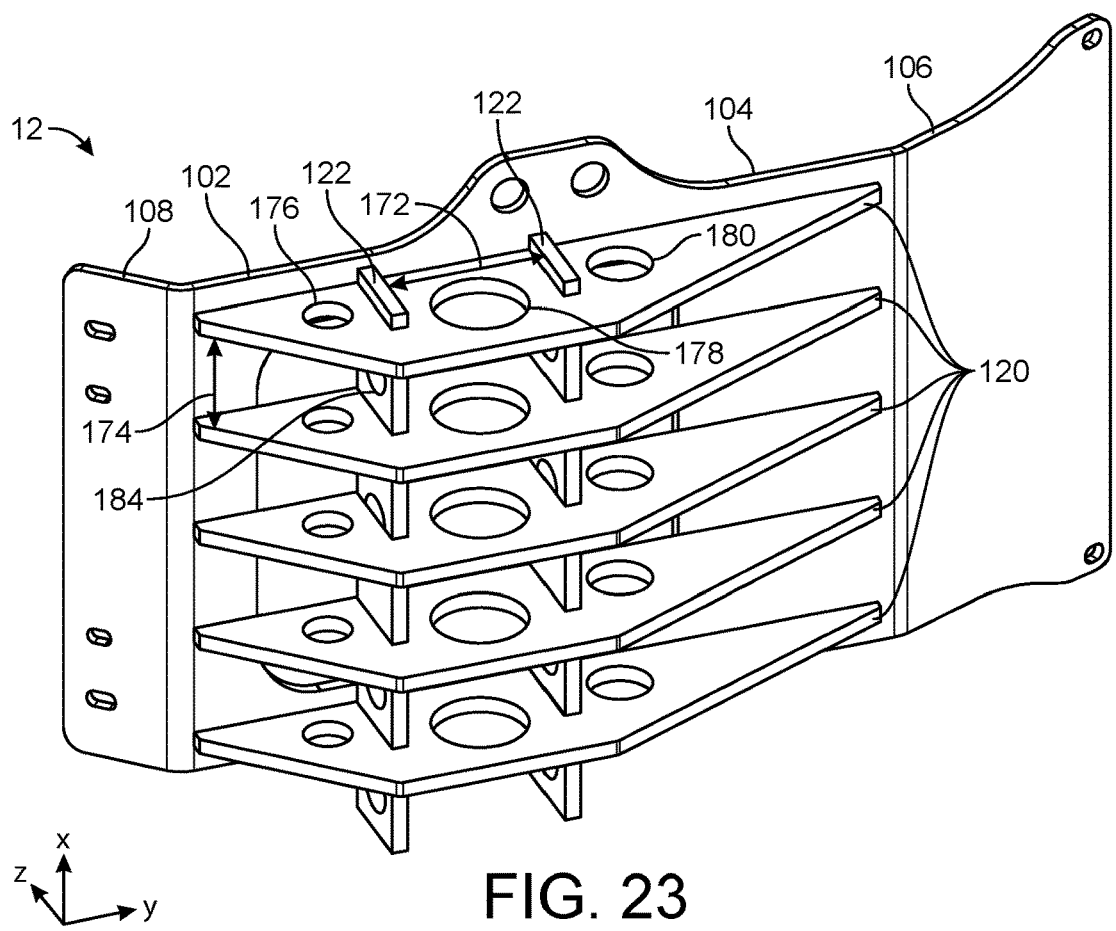
FIG. 23 is a perspective view of the support member of FIG. 9 with weight reducing apertures and openings, according to an exemplary embodiment.
Figure 24:
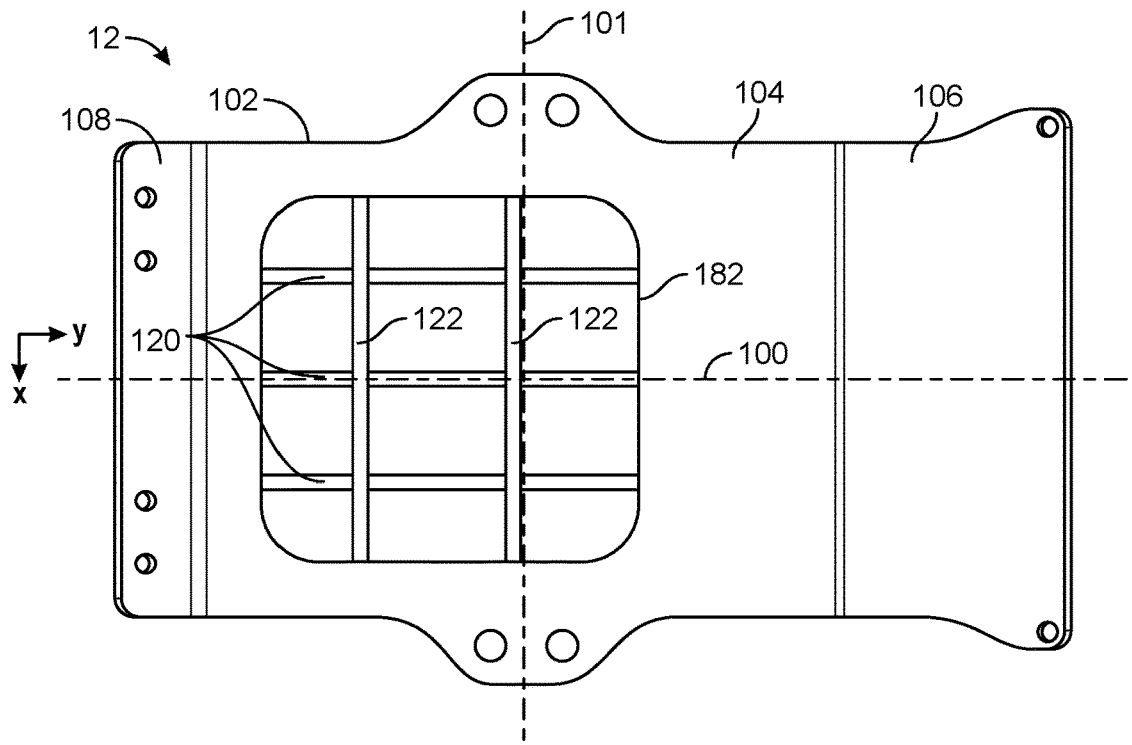
FIG. 24 is a top view of the support member of FIG. 23, according to an exemplary embodiment.

Referring particularly to FIG. 23, laterally extending members 122 can each include one or more apertures, holes, openings, windows, etc., shown as apertures 184. Apertures 184 can extend through an entire thickness of laterally extending member 122. Apertures 184 can have a circular cross-sectional shape, a square cross sectional shape, etc. Apertures 184 can be spaced apart laterally along laterally extending member 122.

Figure 25:
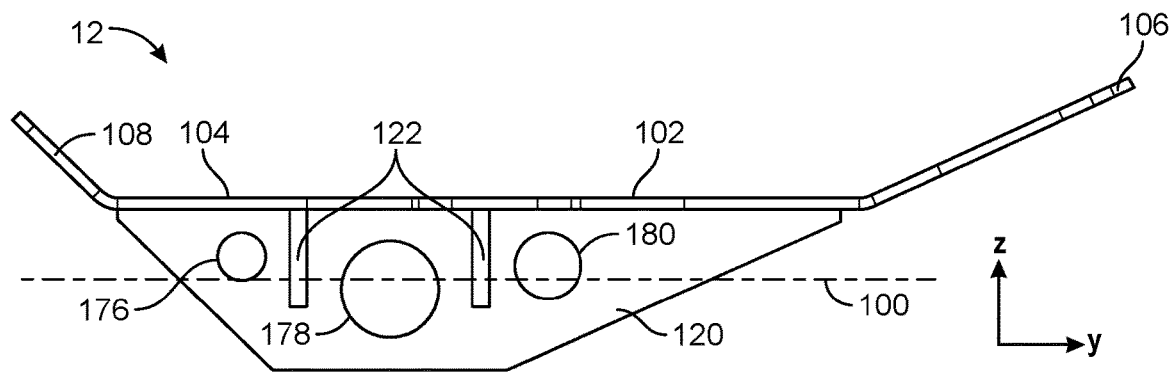
FIG. 25 is a side view of the support member of FIG. 23, according to an exemplary embodiment.
Figure 26:
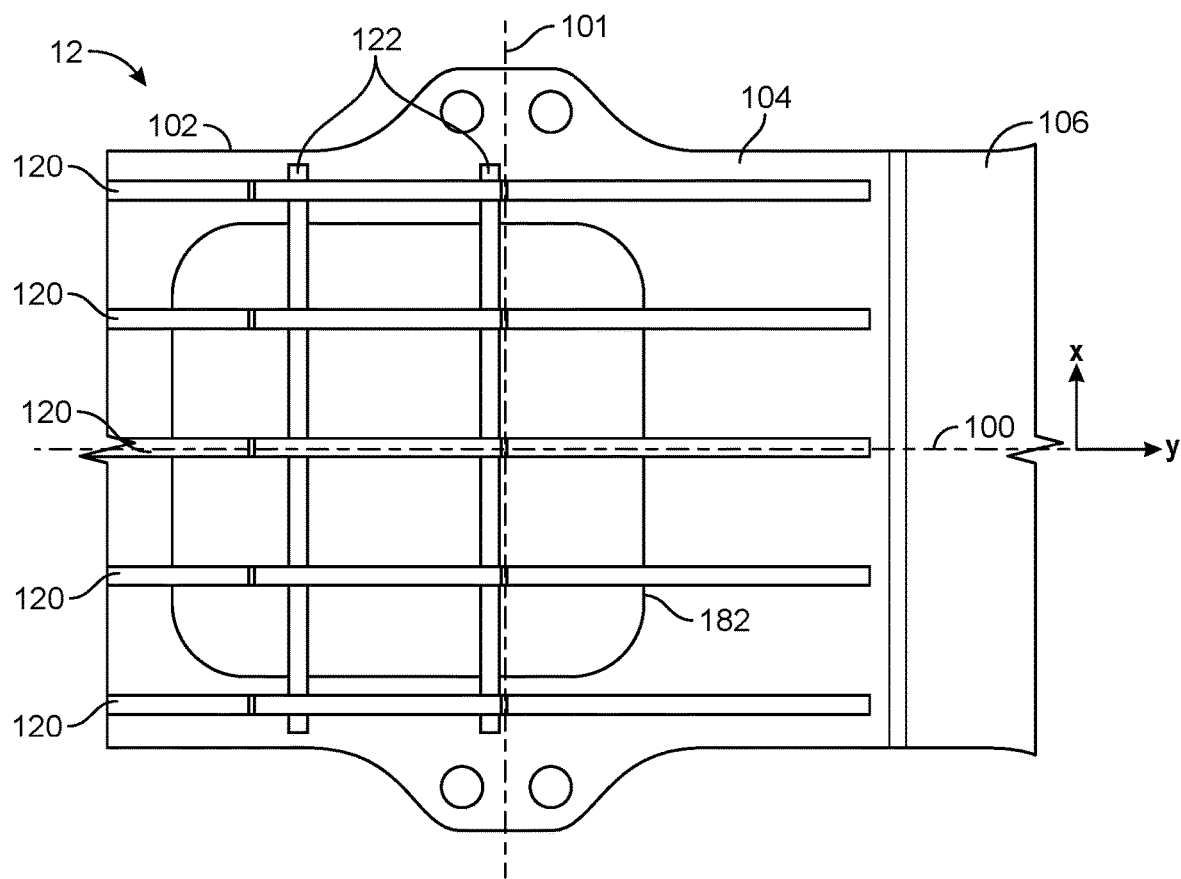
FIG. 26 is a bottom view of the support member of FIG. 23, according to an exemplary embodiment.

Referring particularly to FIGS. 25 and 26, body 102 can include an opening, a window, an aperture, etc., shown as window 182. Window 182 can be centrally located at medial portion 104 of body 102 and may extend through an entire thickness of medial portion 104. Window 182 facilitates reduced weight of stabilizing member 12. Window 182 can have a generally square or rectangular shape with rounded corners. Advantageously, the embodiment of stabilizing member 12 shown in FIGS. 23-26 can have an approximate weight of 44 pounds. This is due to apertures 176-180, 184, and window 182 in addition to the reduced number of laterally extending members 122.

Control System

Figure 27:
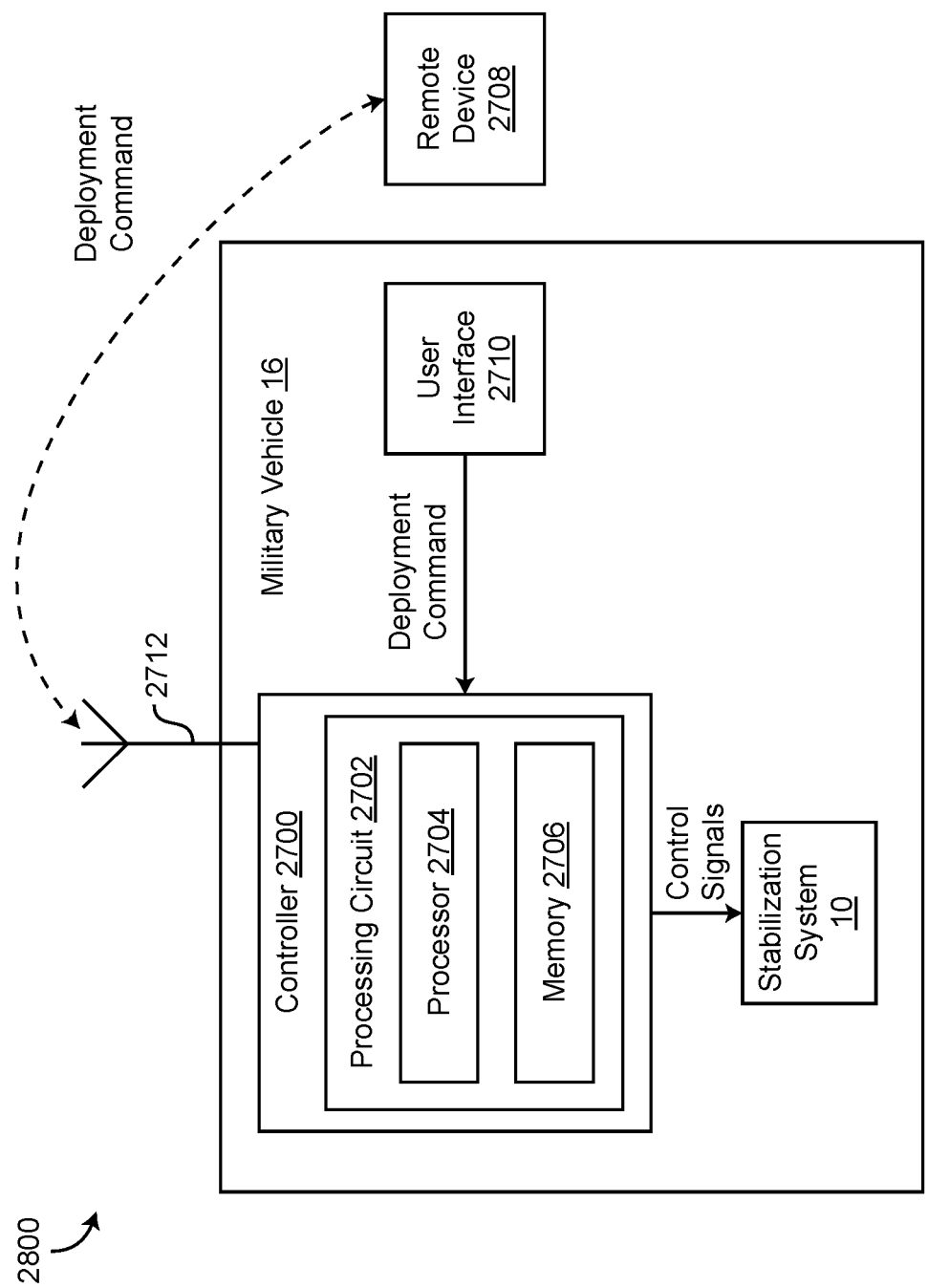
FIG. 27 is a block diagram of a control system for remotely or locally operating a stabilization system of a vehicle, according to an exemplary embodiment.

Referring now to FIG. 27, a control system 2800 for remotely or locally operating stabilization system 10 to transition between the first and the second configurations/positions is shown, according to some embodiments. Military vehicle 16 can include a controller 2700 that is locally positioned and configured to generate control signals for prime mover 30 to transition (e.g., selectably, adjustably, selectably and adjustably, etc.) stabilization system 10 between the first and second configurations/positions (shown in FIGS. 1A and 1B).

Military vehicle 16 can also include a human machine interface, a user interface, a display screen, etc., shown as user interface 2710. User interface 2710 is configured to receive a user input and provide a deployment command to controller 2700 in response to receiving the user input. The user can input the commands to operate prime mover 30 to transition stabilization system 10 between the first and configuration through a button, a lever, a dial, a switch, a joystick, etc. In some embodiments, user interface 2710 is located within a cab of military vehicle 16.

Controller 2700 can also receive deployment commands from a remote device, a remote server, a personal computer device, a remote system, etc., shown as remote device 2708. Controller 2700 can include a long range, a medium range, etc., wireless transceiver 2712. Wireless transceiver 2712 is configured to facilitate wireless communications between controller 2700 and remote device 2708. Wireless transceiver 2712 can be configured to communicate with remote device 2708 using a variety of wireless communications protocols. For example, controller 2700 and remote device 2708 can be configured to wirelessly communicate with each other using radio communications, Internet communications, a cellular network communications, etc., or any other wireless communications.

In response to receiving the deployment command, controller 2700 generates control signals and provides the control signals to prime mover 30 or any controllable elements of stabilization system 10 (e.g., a system that levels the ride height of military vehicle 16) to perform the deployment command. The command can be any command to transition stabilization system 10 between the deployed configuration and the tucked/stowed configuration, or a command to transition stabilization system 10 into a configuration/position that is at least partially between a fully extended/engaged configuration and a fully retracted/stowed configuration.

Controller 2700 can include a communications interface and a processing circuit 2702. The communications interface may include wired or wireless interfaces (e.g., jacks, antennas, transmitters, receivers, transceivers, wire terminals, etc.) for conducting data communications with various systems, devices, or networks. For example, the communications interface may include an Ethernet card and port for sending and receiving data via an Ethernet-based communications network and/or a WiFi transceiver for communicating via a wireless communications network. The communications interface may be configured to communicate via local area networks or wide area networks (e.g., the Internet, a building WAN, etc.) and may use a variety of communications protocols.

The communications interface 2704 may be a network interface configured to facilitate electronic data communications between controller 2700 and various external systems or devices (e.g., user interface 2710, any electronic components of stabilization system 10, remote device 2708, sensors, etc.).

Processing circuit 2702 is shown to include a processor 2704 and memory 2706. Processor 2704 may be a general purpose or specific purpose processor, an application specific integrated circuit (ASIC), one or more field programmable gate arrays (FPGAs), a group of processing components, or other suitable processing components. Processor 2704 may be configured to execute computer code or instructions stored in memory 2706 or received from other computer readable media (e.g., CDROM, network storage, a remote server, etc.).

Memory 2706 may include one or more devices (e.g., memory units, memory devices, storage devices, etc.) for storing data and/or computer code for completing and/or facilitating the various processes described in the present disclosure. Memory 2706 may include random access memory (RAM), read-only memory (ROM), hard drive storage, temporary storage, non-volatile memory, flash memory, optical memory, or any other suitable memory for storing software objects and/or computer instructions. Memory 2706 may include database components, object code components, script components, or any other type of information structure for supporting the various activities and information structures described in the present disclosure. Memory 2706 may be communicably connected to processor 2704 via processing circuit 2702 and may include computer code for executing (e.g., by processor 2704) one or more processes described herein.

It is also contemplated that controller 2700 can be implemented with an on-board computer system of military vehicle 16. In some embodiments, controller 2700 is configured to communicate with the on-board computer system of military vehicle 16 to perform driving operations, ballistic operations, etc. In some embodiments, controller 2700 is configured to generate control signals for any engine systems, driving systems, steering systems, ballistic systems, weapon systems, etc., of military vehicle 16 and provide the control signals to any of the systems of military vehicle 16 to perform a variety of operations (e.g., driving operations, weapon operations, ballistic operations, etc.). In some embodiments, controller 2700 is configured to receive commands from remote device 2708 wirelessly or receive commands for user interface 2710 to control the operation of any of the systems of military vehicle 16. For example, controller 2700 can receive a command from remote device 2708 to transition stabilization system 10 into the second configuration to provide additional stability, and then receive commands from remote device 2708 to operate an on-board ballistics or missile system.

Additionally, remote device 2708 can track extreme weather patterns and provide controller 2700 with deployment commands to deploy stabilization system 10 in response to detecting extreme weather conditions approaching. In some embodiments, military vehicle 16 includes a GPS and is configured to provide remote device 2708 with information regarding a global location (e.g., a latitude and longitude position of military vehicle 16) of military vehicle 16.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the fire suppression system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Additionally, any element disclosed in one embodiment may be incorporated or utilized with any other embodiment disclosed herein. For example, the configuration and construction of the stabilizing member 12 of the exemplary embodiment shown in FIGS. 11-14 may be incorporated in the stabilization system 10 of the exemplary embodiment shown in FIGS. 1A-1B. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A stabilization system for a military vehicle, the stabilization system comprising:
 a support member coupled to an underside of the military vehicle with a four bar linkage, the support member configured to selectively transition between a first position and a second position, wherein the support member is tucked beneath a body of the military vehicle when in the first position and engages a ground surface below the body of the military vehicle when in the second position; and
 a first linkage and second linkage pivotally coupled with each other, the first linkage and second linkage separate from the four bar linkage;
 a primary mover configured to selectively and adjustably drive the support member to transition between the first position and the second position by driving the first linkage, wherein the first linkage is coupled with an output of the primary mover, and the second linkage is pivotally coupled with the support member or a portion of the four bar linkage;
 wherein the support member is configured to provide additional stability for the military vehicle during a ballistics operation through the engagement between the support member and the ground surface.

2. The stabilization system of claim 1, wherein the support member is configured to protect the underside of the military vehicle when in the first position.

3. A stabilization system for an adjustable ride height military vehicle, the system comprising:
 a support member fixedly coupled with an underside of the military vehicle and extending in a downwards direction from the underside of the military vehicle, wherein the support member is configured to engage a ground surface directly below the military vehicle when the military vehicle lowers from a first position to a second position, the support member comprising:
  a body comprising a first angled portion, a second angled portion, and a medial portion;
  a plurality of longitudinally extending members disposed on a bottom of the medial portion of the body;
  a plurality of laterally extending members disposed on the bottom of the medial portion of the body; and
  a plate extending along a bottom of the plurality of longitudinally extending members and the laterally extending members, wherein the longitudinally extending members and the laterally extending members are sandwiched between the body and the plate, wherein the plate defines an engagement surface of the support member to engage the ground surface:
 wherein the support member is configured to provide additional stability for the military vehicle during a ballistics operation through the engagement between the support member and the ground surface when the military vehicle is lowered to the second position.

4. The stabilization system of claim 1, wherein the four bar linkage comprises:
 a first member pivotally coupled at a first end with a plate that is fixedly coupled with the underside of the military vehicle, and pivotally coupled at a second end with the support member;
 a second member pivotally coupled at a first end with the plate and pivotally coupled at the second end with the support member.

5. The stabilization system of claim 4, wherein the primary mover is a rotary actuator configured to drive the four bar linkage to selectively transition the support member between the first position and the second position.

6. The stabilization system of claim 1, wherein the support member is pivotally coupled at a first end with the underside of the military vehicle, wherein the support member is driven by the primary mover to rotate relative to the underside of the military vehicle between the first position and the second position.

7. The stabilization system of claim 1, wherein the support member is coupled with the underside of the military vehicle through a scissors mechanism, the scissors mechanism configured to receive mechanical energy from the primary mover to drive the support member to translate between the first position and the second position.

8. The stabilization system of claim 3, wherein the body member comprises an opening extending through an entire thickness of the body member.

9. The stabilization system of claim 3, wherein the plurality of longitudinally extending members are trapezoidally shaped members.

10. The stabilization system of claim 3, wherein the body member comprises a plurality of openings extending through an entire thickness of the body member.

11. The stabilization system of claim 3, wherein each of the plurality of longitudinally extending members comprise a plurality of apertures, each aperture of the plurality of apertures extending through a thickness of the longitudinally extending member.

12. The stabilization system of claim 3, wherein each of the plurality of laterally extending members comprise a plurality of apertures, the plurality of apertures extending through an entire thickness of the laterally extending member.

13. The stabilization system of claim 3, further comprising:
- a controller comprising a wireless transceiver, the controller operably coupled with a primary mover and configured to operate a suspension component of the military vehicle to lower the military vehicle into the second position.

14. A stabilization system for a vehicle, the stabilization system comprising:
- a first set of a plurality of support members pivotally coupled with an underside of the military vehicle, wherein the plurality of support members of the first set are configured to rotate in unison to transition the stabilization system between a tucked configuration and a deployed configuration;
- a second set of a plurality of support member pivotally coupled with the underside of the military vehicle, wherein the plurality of support members of the second set are configured to rotate in unison to transition the stabilization system between the tucked configuration and the deployed configuration;
- wherein the plurality of support members of the first set are rotated in a first direction to transition the stabilization system from the tucked configuration to the deployed configuration and the plurality of support members of the second set are rotated in a second direction, opposite the first direction, to transition the stabilization system from the tucked configuration to the deployed configuration;
- wherein an inner most support member of the first set of the plurality of support members and an inner most support member of the second set of the plurality of support members are coupled with a slotted member.

15. The stabilization system of claim 14, further comprising an actuator, wherein the actuator is fixedly coupled with the military vehicle and configured to drive the first set of the plurality of support members and the second set of the plurality of support members to rotate to transition the stabilization system from the tucked configuration to the deployed configuration.

* * * * *